United States Patent
Dvorak

(10) Patent No.: US 11,354,494 B2
(45) Date of Patent: Jun. 7, 2022

(54) METHODS AND SYSTEMS FOR CONNECTING A SPREADSHEET TO EXTERNAL DATA SOURCES WITH FORMULAIC SPECIFICATION OF DATA RETRIEVAL

(71) Applicant: Adaptam Inc., Atherton, CA (US)

(72) Inventor: Robert E. Dvorak, Atherton, CA (US)

(73) Assignee: Adaptam Inc., Atherton, CA (US)

( * ) Notice: Subject to any disclaimer, the term of this patent is extended or adjusted under 35 U.S.C. 154(b) by 241 days.

(21) Appl. No.: 16/031,379

(22) Filed: Jul. 10, 2018

(65) Prior Publication Data

US 2019/0012305 A1   Jan. 10, 2019

Related U.S. Application Data

(60) Provisional application No. 62/530,786, filed on Jul. 10, 2017, provisional application No. 62/530,794, (Continued)

(51) Int. Cl.
*G06F 40/18* (2020.01)
*G06F 40/103* (2020.01)
(Continued)

(52) U.S. Cl.
CPC .............. *G06F 40/186* (2020.01); *G06F 8/34* (2013.01); *G06F 16/901* (2019.01);
(Continued)

(58) Field of Classification Search
None
See application file for complete search history.

(56) References Cited

U.S. PATENT DOCUMENTS 5,815,421 A   9/1998 Dulong et al.
6,317,750 B1  11/2001 Tortolani et al.
(Continued)

OTHER PUBLICATIONS

"Copying Formulas and using Relative and Absolute Cell References Tutorial", Mar. 16, 2016, www.teststeststests.com, pp. 1-13 (Year: 2016).*

(Continued)

*Primary Examiner* — Ariel Mercado
(74) *Attorney, Agent, or Firm* — Haynes Beffel & Wolfeld, LLP; Ernest J. Beffel, Jr.

(57) ABSTRACT

The technology disclosed relates to accessing external data in spreadsheet cells and includes spreadsheet cells that can use formulaically defined external data, allowing users to utilize many cells as if they were one cell and to simplify or expand the type of calculations possible within a cell. The disclosed technology further includes a spreadsheet application that can perform looped calculations within the spreadsheet cells without the need to use an embedded programming language. Additionally the disclosed spreadsheet application can use named variables and formulaic cell designators for cell operations in which formulaically defined non-spreadsheet cell data variables and their values can be exposed and multiple values can exist in a cell, and the user can step through and see those different values.

17 Claims, 20 Drawing Sheets
(19 of 20 Drawing Sheet(s) Filed in Color)

Related U.S. Application Data filed on Jul. 10, 2017, provisional application No. 62/530,835, filed on Jul. 10, 2017.

(51) Int. Cl.

| | |
|---|---|
| *G06F 40/186* | (2020.01) |
| *G06F 8/34* | (2018.01) |
| *G06F 40/16* | (2020.01) |
| *G06F 40/174* | (2020.01) |
| *G06F 40/205* | (2020.01) |
| *G06F 16/903* | (2019.01) |
| *G06F 16/901* | (2019.01) |
| *G06F 17/11* | (2006.01) |
| *G06F 9/451* | (2018.01) |

(52) U.S. Cl.
CPC ............ *G06F 16/903* (2019.01); *G06F 17/11* (2013.01); *G06F 40/103* (2020.01); *G06F 40/16* (2020.01); *G06F 40/174* (2020.01); *G06F 40/18* (2020.01); *G06F 40/205* (2020.01); *G06F 9/453* (2018.02)

(56) References Cited

U.S. PATENT DOCUMENTS

| | | | |
|---|---|---|---|
| 6,985,895 B2 | 1/2006 | Witkowski et al. | |
| 6,988,241 B1 | 1/2006 | Guttman et al. | |
| 7,099,890 B2 | 8/2006 | Cahill et al. | |
| 7,117,435 B1 | 10/2006 | Kotler et al. | |
| 7,120,866 B2 | 10/2006 | Kotler et al. | |
| 7,155,667 B1 | 12/2006 | Kotler et al. | |
| 7,302,444 B1 | 11/2007 | Dunmore et al. | |
| 7,350,141 B2 | 3/2008 | Kotler et al. | |
| 7,370,274 B1 | 5/2008 | Stuple et al. | |
| 7,412,645 B2 | 8/2008 | Kotler et al. | |
| 7,506,242 B2 | 3/2009 | Kotler et al. | |
| 7,506,243 B2 | 3/2009 | Kotler et al. | |
| 7,523,390 B2 | 4/2009 | Kotler et al. | |
| 7,546,533 B2 | 6/2009 | Sareen et al. | |
| 7,549,115 B2 | 6/2009 | Kotler et al. | |
| 7,673,227 B2 | 3/2010 | Kotler et al. | |
| 7,702,997 B2 | 4/2010 | Kotler et al. | |
| 7,702,998 B2 | 4/2010 | Kotler et al. | |
| 7,810,032 B2 | 10/2010 | Bauchot et al. | |
| 8,140,549 B2 | 3/2012 | Barinaga | |
| 8,312,371 B2 | 11/2012 | Ording | |
| 8,341,512 B2 | 12/2012 | Sol et al. | |
| 9,092,412 B2 | 7/2015 | Saleh et al. | |
| 9,305,176 B2 | 4/2016 | Gloski et al. | |
| 9,436,652 B2 | 9/2016 | Kommanaboyina | |
| 9,727,989 B2 | 8/2017 | Garg et al. | |
| 9,990,349 B2 | 6/2018 | Campbell et al. | |
| 10,019,758 B2 | 7/2018 | Bartolucci | |
| 10,140,352 B2 | 11/2018 | Hariharan et al. | |
| 2002/0036662 A1 | 3/2002 | Gauthier et al. | |
| 2002/0169799 A1* | 11/2002 | Voshell .................. | G06F 40/18 715/212 |
| 2003/0009411 A1 | 1/2003 | Ram et al. | |
| 2003/0110191 A1 | 6/2003 | Handsaker et al. | |
| 2003/0212953 A1 | 11/2003 | Serraf | |
| 2005/0044496 A1 | 2/2005 | Kotler et al. | |
| 2006/0069635 A1 | 3/2006 | Ram et al. | |
| 2006/0131383 A1 | 6/2006 | Battagin et al. | |
| 2007/0005635 A1 | 1/2007 | Martinez et al. | |
| 2007/0136666 A1 | 6/2007 | Khen et al. | |
| 2010/0211862 A1 | 8/2010 | Parish et al. | |
| 2013/0013994 A1* | 1/2013 | Handsaker ............... | G06F 40/18 715/217 |
| 2013/0021377 A1 | 1/2013 | Doll | |
| 2013/0073939 A1* | 3/2013 | Honsowetz ............. | G06F 40/18 715/212 |
| 2015/0082137 A1 | 3/2015 | Zarpas | |
| 2015/0149893 A1 | 5/2015 | Lukic et al. | |
| 2015/0254226 A1* | 9/2015 | Renshaw ................ | G06F 40/18 715/219 |
| 2016/0055139 A1 | 2/2016 | Creason et al. | |
| 2016/0124932 A1* | 5/2016 | Chen .................... | G06F 16/2423 715/217 |
| 2016/0142488 A1* | 5/2016 | Adler ..................... | G06F 40/18 709/217 |
| 2016/0371249 A1 | 12/2016 | Chilakamarri et al. | |
| 2017/0004125 A1 | 1/2017 | Honsowetz | |
| 2017/0124046 A1 | 5/2017 | Campbell et al. | |
| 2017/0124049 A1 | 5/2017 | Campbell et al. | |

OTHER PUBLICATIONS

"Parts of an Algebraic Expression", Nelson Mathematics Secondary Year Two, Cycle One, 2009, Nelson Education Ltd., 4 pages.

U.S. Appl. No. 16/031,759—Office Action with Restriction Requirement dated Dec. 30, 2019, 53 pages.

U.S. Appl. No. 16/031,759—Response to Office Action dated Dec. 30, 2019, filed Jun. 1, 2020, 12 pages.

U.S. Appl. No. 16/031,759—Final Office Action dated Sep. 4, 2020, 54 pages.

U.S. Appl. No. 16/031,339—Non-Final Office Action dated Nov. 21, 2019, 36 pages.

U.S. Appl. No. 16/031,339—Response to Office Action dated Nov. 21, 2019, filed Apr. 21, 2020, 36 pages.

U.S. Appl. No. 16/031,339—Final Office Action dated May 21, 2020, 54 pages.

U.S. Appl. No. 16/031,339—Response to Final Office Action dated May 21, 2020, filed Nov. 23, 2020, 16 pages.

U.S. Appl. No. 16/031,339—Nonfinal Office Action dated Dec. 21, 2020, 63 pages.

Understanding Styles in Microsoft Word—A Tutorial in the Intermediate Users Guide to Microsoft Word, last edited by Charles Kenyon on Apr. 30, 2017, retrieved from http://www.addbalance.com/usersguide/styles.htm, archived on Jun. 30, 2017, 55 pages.

"Apply multiple styles to single text selection", Microsoft Community , answers.mircrosoft.com, Apr. 9, 2018, 3 pages accessed Apr. 21, 2020 at https://answers.microsoft.com/en-us/msoffice/forum/msoffice_word-mso_mac-mso_mac2011/apply-multiple-styles-to-single-text-selection/654ca4ad-a202-43aa-b7e1-b4c7cdea5acb).

U.S. Appl. No. 16/031,759—Response to Final Office Action dated Sep. 4, 2020, filed Jan. 4, 2021, 14 pages.

"How to create and share custom Stylesheets in Microsoft Word", PC World Magazine, Sep. 14, 2014, 13 pages downloaded from https://web.archive.org/web/20140914082635/https://www.pcworld.com/article/2156364/how-to-create-and-share-custom-style-sets.html Jan. 6, 2021).

Sartain, JD, "How to create and share custom Style Sheets in Wordand PowerPoint", PC World Magazine, Aug. 8, 2018, 11 pages (downloaded from https://www.pcworld.com/article/2156364/how-to-create-and-share-custom-style-sets.html Jan. 6, 2021).

\* cited by examiner

|  | Discrete | Non - Discrete |
|---|---|---|
| Keyed | One value<br>Formulaic variable name & keys<br>e.g., Weight(Exp,Dish,Date)<br>RGB(Exp,Dish,Date) | Multiple data<br>Formulaic variable name, any keys & formulaic designator<br>e.g., Exp(...!)<br>Dish(Exp,!...!) |
| Non-Keyed | One value<br>Formulaic variable name only<br>e.g., Lab_Experiments | Multiple messy data<br>Formulaic variable name & formulaic designator<br>e.g., Name(!row!)<br>Address(!row!) |

Our Formulaic Data prepares all types of external data (e.g., normal spreadsheet cell, formula, function, & copy/paste usage — 138

| | Exp | Dish_Test_type | T_vs_C | Day | Weight | Size | Color_R | Color_G | Color_B |
|---|---|---|---|---|---|---|---|---|---|
| 1 | 955 | 20023 P_dish_55 | t | 1 | 0.126 | 1,213 | 255 | 174 | 174 |
| 2 | 955 | 20432 P_dish_55 | t | 1 | 0.131 | 1,241 | 255 | 185 | 175 |
| 3 | 955 | 20835 P_dish_55 | t | 1 | 0.121 | 1,208 | 254 | 190 | 185 |
| 4 | 955 | 20934 P_dish_55 | c | 1 | 0.115 | 1,165 | 253 | 178 | 185 |
| 5 | 955 | 21009 P_dish_55 | c | 1 | 0.128 | 1,220 | 254 | 181 | 179 |
| 6 | 955 | 21011 P_dish_55 | t | 1 | 0.127 | 1,218 | 255 | 188 | 175 |
| 7 | 955 | 20023 P_dish_55 | t | 2 | 0.129 | 1,237 | 255 | 176 | 176 |
| 8 | 955 | 20432 P_dish_55 | t | 2 | 0.134 | 1,266 | 255 | 187 | 177 |
| 9 | 955 | 20835 P_dish_55 | t | 2 | 0.122 | 1,222 | 254 | 192 | 187 |
| 10 | 955 | 20934 P_dish_55 | c | 2 | 0.116 | 1,179 | 253 | 179 | 186 |
| 11 | 955 | 21009 P_dish_55 | c | 2 | 0.130 | 1,235 | 254 | 182 | 180 |
| 12 | 955 | 21011 P_dish_55 | t | 2 | 0.129 | 1,233 | 254 | 189 | 176 |

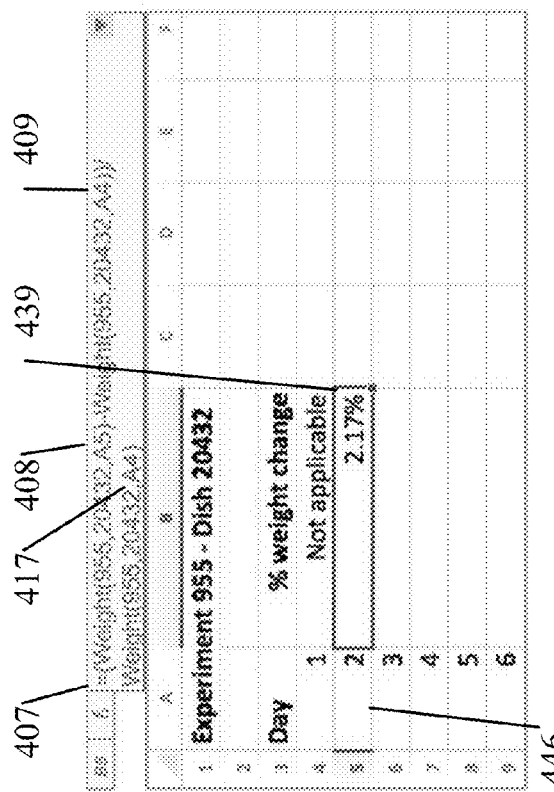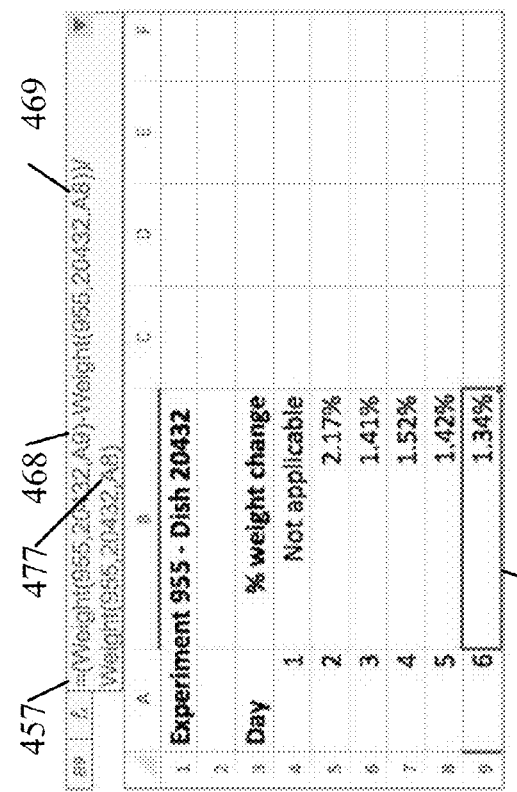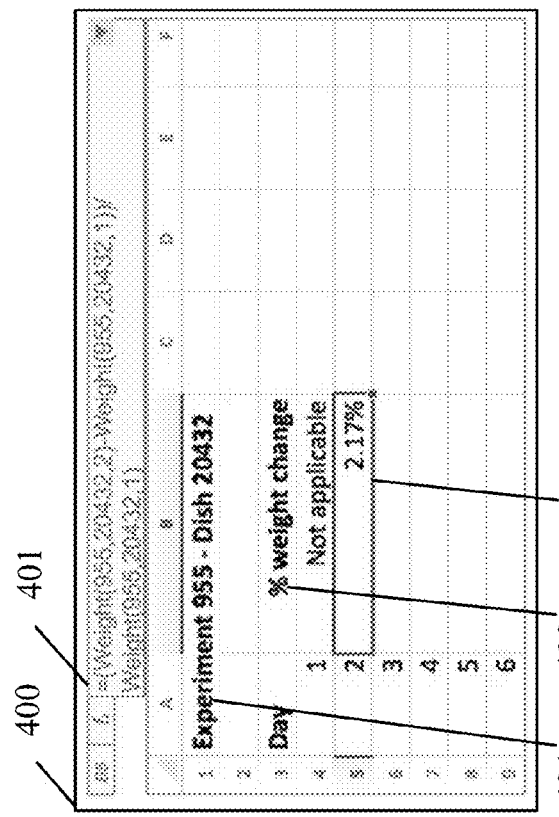
FIG. 4A
FIG. 4B
FIG. 4C

| | A | B | C | D | E | F | G |
|---|---|---|---|---|---|---|---|
| 1 | Experiment 955 - Average values over all test days | | | | | | |
| 2 | | | | | | | |
| 3 | | | | $f_x$ | | | |
| 4 | Weight (grams) | 0.1595 | B4 | | =SUM(Weight(955,$F$1,$F$3))/ Weight(955,$L$1,$L$1))/ COUNT(Weight(955,$F$1,$F$3), Weight(955,$L$1,$L$1)) | | |
| 5 | Size (cm) | 1.951 | | | | | |
| 6 | Color - R value | 255 | | | | | |
| 7 | - G value | 194 | | | | | |
| 8 | - B value | 188 | B10 | $f_x$ | =SUM(Color_B(955,$F$1,$F$3), Color_B(955,$L$1,$L$1))/ COUNT(Color_B(955,$F$1,$F$3), Color_B(955,$L$1,$L$1)) | | |
| 9 | | | | | | | |
| 10 | | | | | | | |
| 11 | | | | | | | |
| 12 | | | | | | | |

746 → (points to formula in row 4)
776 → (points to formula in row 8)

FIG. 7

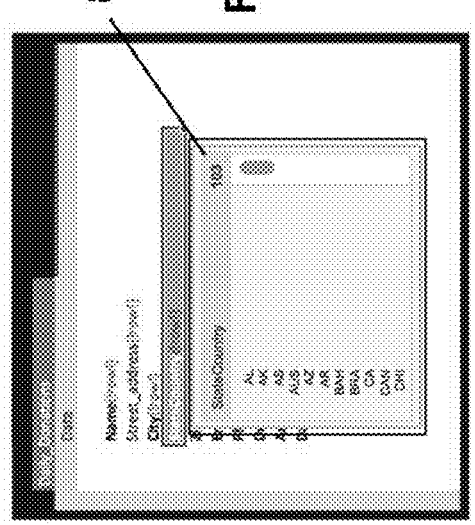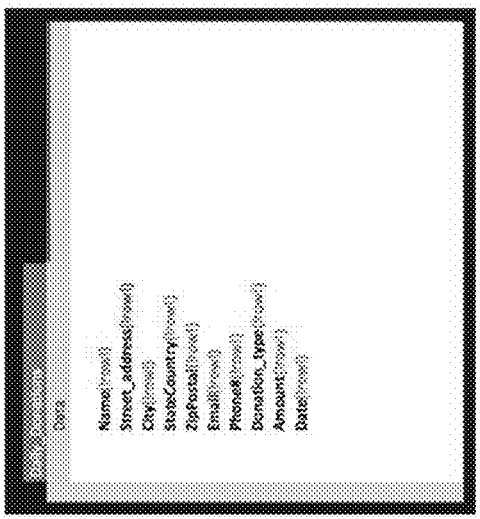

1012 — =CRUN($D$3)|A$1

| | A | B |
|---|---|---|
| 1 | Data Classification | |
| 2 | | |
| 3 | Data | Classification |
| 4 | | |
| 5 | Lab test 504 | Contains text |
| 6 | 0.1245 | Positive |
| 7 | 0 | Zero |
| 8 | -5 | Negative |
| 9 | | Is blank |
| 10 | 1.436 | Contains a formula |
| 11 | #DIV/0! | Contains an error |
| 12 | 400 | Positive |

1033 → Contains text (B5)
1043 → cells B6–B12

1034, 1025 — callout box:
=RUN(D3)|value:|
=IF(ISERROR(value)=TRUE,"Contains an error",D4)
=IF(ISFORMULA(value)=TRUE,"Contains a formula",D5)
=IF(ISBLANK(value)=TRUE,"Cell is blank",D6)
=IF(value>0,"Positive number",D7)
=IF(value<0,"Negative number","Zero")
=END (D3)

=CRUN($D$3)|LAB_RESULTS_COLUMN_2(955,20023.FF)|

| | A | B |
|---|---|---|
| 1 | Data Classification | |
| 2 | | |
| 3 | Data | Classification |
| 4 | | |
| 5 | | Contains text |
| 6 | | Positive |
| 7 | | Zero |
| 8 | | Negative |
| 9 | | Is blank |
| 10 | | Contains a formula |
| 11 | | Contains an error |
| 12 | | Positive |

1062, 1073, 1083

1074 — callout box:
=RUN(D3)|value:|
=IF(ISERROR(value)=TRUE,"Contains an error",D4)
=IF(ISFORMULA(value)=TRUE,"Contains a formula",D5)
=IF(ISBLANK(value)=TRUE,"Cell is blank",D6)
=IF(value>0,"Positive number",D7)
=IF(value<0,"Negative number","Zero")
=END (D3)

| | A | B | C | D | E | F | G | H |
|---|---|---|---|---|---|---|---|---|
| 1 | | Daily Weight Change loop | | | | | | |
| 2 | | =LOOP{B3}{Exp}{IF}{Exp}{1L}} | | | | | | |
| 3 | | =LOOP{B4}{Dish}{K3,IF}{Dish(K3,IL}} | | | | | | |
| 4 | | =LOOP{B5}{Day(Exp,Dish,IF+1),Day(Exp,Dish,IL)} | | | | | | |
| 5 | | DailyWChg{B3,B4,B5}=Weight(Exp,Dish,K5)-Weight(Exp,Dish,K5-1) | | | | | | |
| 6 | | =STORE{DailyWChange{B3,B4,B5};Server55/Drive:D/Table_88} | | | | | | |
| 7 | | =NEXT{B5} | | | | | | |
| 8 | | =NEXT{B4} | | | | | | |
| 9 | | =NEXT{B3} | | | | | | |

1513 → row 5
1514 → row 6

FIG. 15B

1566 — =STORE{ ... }
STORE{Variable_name};Server55/Drive:D/Table_88}

1576 — =SHARE{ ... }
SHARE{Variable_name or group};
STORE{Group_3};
STORE{Group_9};

1586 — =STORESHA{ ... }

1596 — STORESHARE{Variable_name or group};
STORESHARE{Server55/Drive:D/Table_88;Group_3};
STORESHARE{Server71/Drive:A/Group_9};

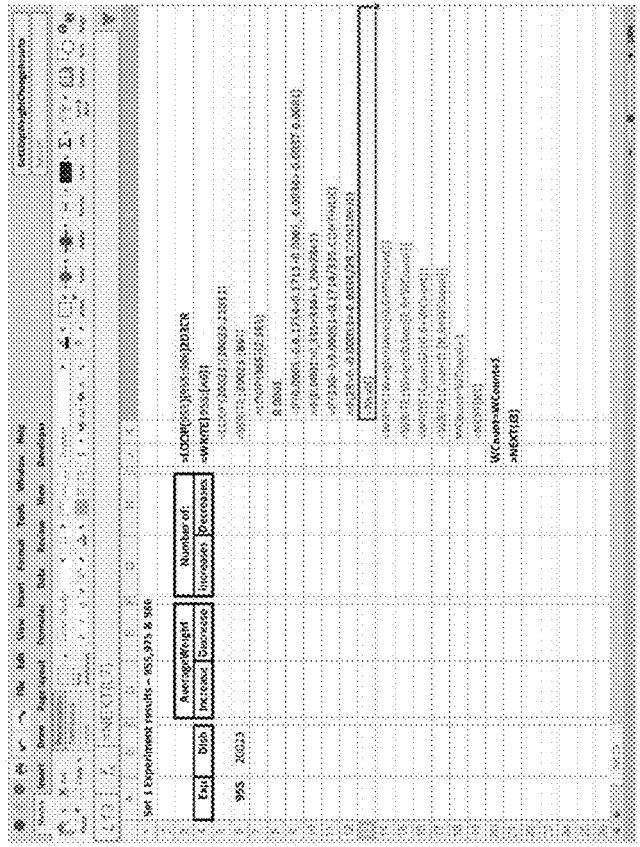
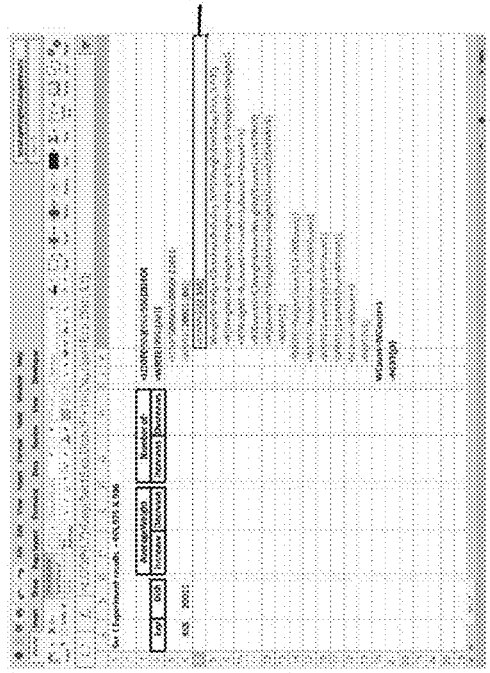
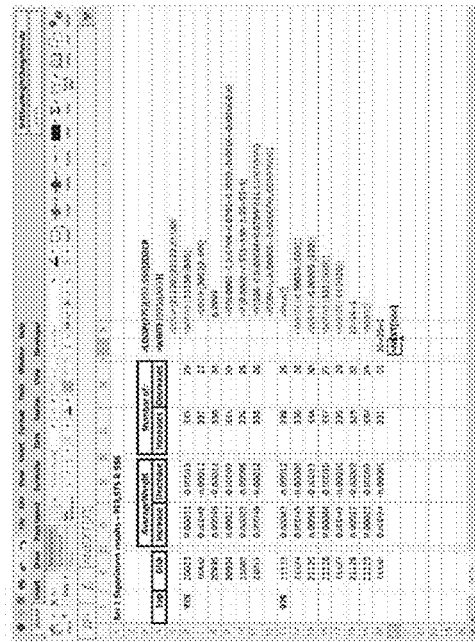
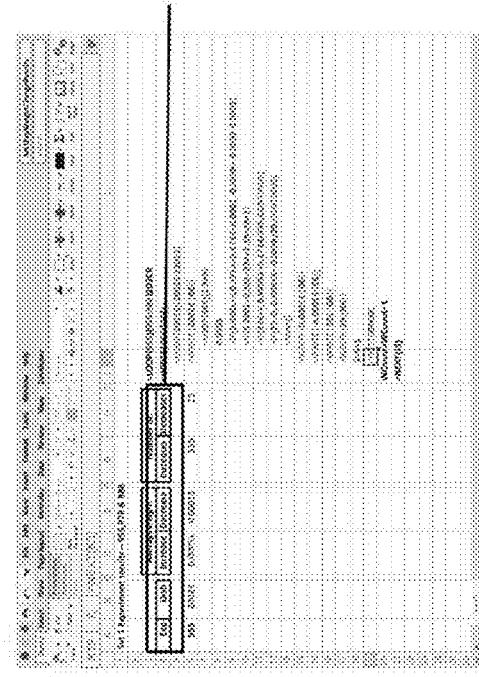
FIG. 17A
FIG. 17B
FIG. 17C
FIG. 17D

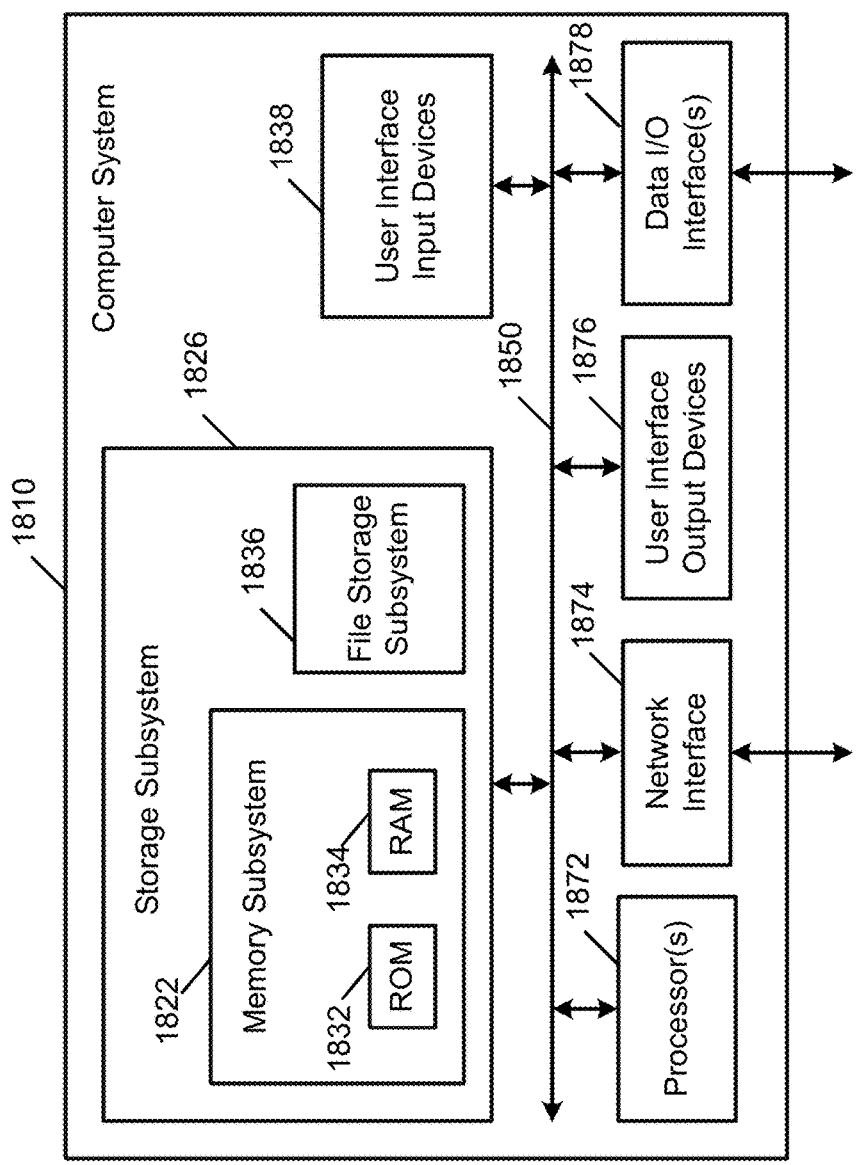
Fig. 18 Computer System

METHODS AND SYSTEMS FOR CONNECTING A SPREADSHEET TO EXTERNAL DATA SOURCES WITH FORMULAIC SPECIFICATION OF DATA RETRIEVAL

PRIORITY APPLICATIONS

This application claims the benefit of three provisional applications filed on the same day. One is U.S. Provisional Patent Application No. 62/530,835, entitled, "METHODS AND SYSTEMS FOR PROVIDING SELECTIVE MULTI-WAY REPLICATION AND ATOMIZATION OF CELL BLOCKS AND OTHER ELEMENTS IN SPREADSHEETS AND PRESENTATIONS" filed on Jul. 10, 2017. The next is U.S. Provisional Application No. 62/530,786, entitled, "METHODS AND SYSTEMS FOR CONNECTING A SPREADSHEET TO EXTERNAL DATA SOURCES WITH FORMULAIC SPECIFICATION OF DATA RETRIEVAL" filed on Jul. 10, 2017. Another is U.S. Provisional Patent Application No. 62/530,794, entitled, "METHODS AND SYSTEMS FOR CONNECTING A SPREADSHEET TO EXTERNAL DATA SOURCES WITH TEMPORAL REPLICATION OF CELL BLOCKS" filed on Jul. 10, 2017.

RELATED APPLICATIONS

This application is related to contemporaneously filed applications U.S. patent application Ser. No. 16/031,339, entitled, "METHODS AND SYSTEMS FOR PROVIDING SELECTIVE MULTI-WAY REPLICATION AND ATOMIZATION OF CELL BLOCKS AND OTHER ELEMENTS IN SPREADSHEETS AND PRESENTATIONS" filed on Jul. 10, 2018; and U.S. patent application Ser. No. 16/031,759, entitled, "METHODS AND SYSTEMS FOR CONNECTING A SPREADSHEET TO EXTERNAL DATA SOURCES WITH TEMPORAL REPLICATION OF CELL BLOCKS" also filed on Jul. 10, 2018.

The related and priority applications are hereby incorporated by reference for all purposes.

BACKGROUND

The technology disclosed relates to formulaically handling large, complex data sets in spreadsheet applications, replicating spreadsheet functionality for non-spreadsheet cell data. In particular, it relates to ways for users to work with a broad spectrum of numeric and text data not stored in a spreadsheet, including data not discretely defined. The technology disclosed also relates to displaying non-spreadsheet cell data formulas, formulaic values and numeric values in cells, while stepping through a progression of complicated calculations.

An opportunity arises to offer spreadsheet calculation capabilities that scale beyond one calculation per cell, allowing users to perform scalable calculations in spreadsheet cells, which previously would have required coding in an embedded software language. Better, easier analysis of complicated external data sets may result.

SUMMARY

The technology disclosed relates to accessing external data in spreadsheet cells. In one implementation, a spreadsheet application includes spreadsheet cells that can use formulaically defined external data in ways that are like existing spreadsheet copy and paste and formula functions. In particular, the technology relates to a spreadsheet application that allows users to utilize many cells as if they were one cell, to simplify or expand the type of calculations possible within a cell. The disclosed technology further includes a spreadsheet application that can perform looped calculations within the spreadsheet cells without the need to use an embedded programming language. Additionally, the disclosed spreadsheet application can use named variables and formulaic cell designators for cell operations in which formulaically defined non-spreadsheet cell data variables and their values can be exposed and multiple values can exist in a cell, and the user can step through and see those different values.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 1 illustrates our formulaic data approach to handling non-spreadsheet cell (NSC) alphanumeric data FIG. 2A shows a subset of a very large data set. FIG. 2B, FIG. 2C, FIG. 2D and FIG. 2E illustrates a traditional prior art copy and paste feature for spreadsheet cell data.

FIG. 4A, FIG. 4B and FIG. 4C show examples of spreadsheet formula usage of NSC Formulaic Data and its copy/paste capabilities FIG. 6A and FIG. 6B show the copy and paste capabilities of cell value-driven Formulaic Data variables and FIRST/LAST designated Formulaic Data variables FIG. 7 illustrates multi-keyed Formulaic Data use of the FIRST/LAST commands FIG. 8A, FIG. 8B and FIG. 8C display a non-keyed non-discrete data set and some of our Formulaic data views of that data FIG. 9A, FIG. 9B, FIG. 9C and FIG. 9D illustrate the use of our non-keyed non-discrete Formulaic Data in spreadsheet cell formulas, functions and copy/paste.

FIG. 10A and FIG. 10B illustrate the use of our RUN and CRUN multi-cell capabilities to reduce complexity for users.

FIG. 12A, FIG. 12B and FIG. 12C shows the use of Spreadsheet cell LOOPs, Formulaic Cell Designators, Increment cells and Increment variables.

FIG. 13A, FIG. 13B, FIG. 13C and FIG. 13D shows the use of Formulaic Data driven Spreadsheet Cell LOOPs.

FIG. 14A and FIG. 14B illustrate the use of nested LOOPs, more complicated Formulaic Cell Designators, and our WRITE command.

FIG. 15A, FIG. 16B and FIG. 15B illustrate generating Formulaic data within our spreadsheet and then Storing and Sharing in the Cloud or other NSC database.

FIG. 16A through FIG. 16C show different LOOP and multi-cell calculation layouts and help support.

FIG. 17A, FIG. 17B, FIG. 17C and FIG. 17D illustrates a debugging step through calculations viewer showing cell formulas and values in a user controllable progressive manner FIG. 18 shows the use of a computer system to implement the technology disclosed.

DETAILED DESCRIPTION

Figure 3A:
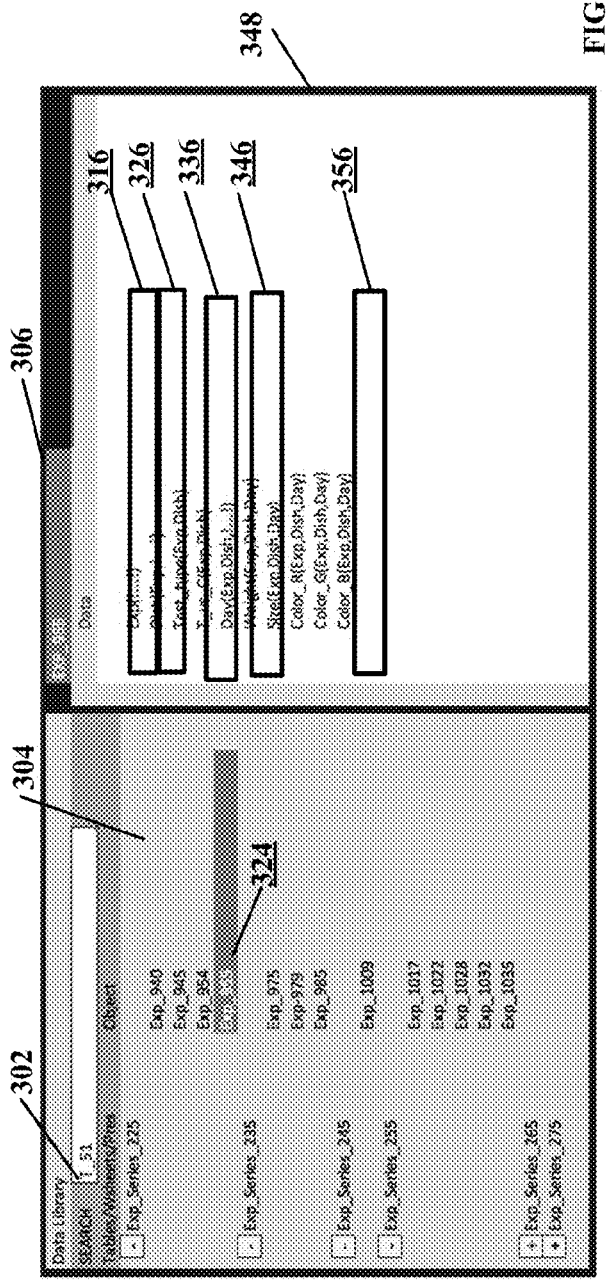
FIG. 3A and FIG. 3B example two different approaches for searching and displaying formulaic data.

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, MICROSOFT EXCEL™, GOOGLE SHEETS™, APPLE NUMBER™ and others have dramatically increased the breadth of capabilities and usefulness of spreadsheets. Spreadsheet applications now access data across a wide variety of sources including relational, structured and semi-structured, open data protocol (OData), Web and HADOOP™ among others; and these applications manipulate data—such as in pivot tables and via MICROSOFT POWERPIVOT™. Additionally, spreadsheets have extensive functionality for creating charts with SmartArt and for building forms, and they even have programming languages embedded within them, such as VISUAL BASIC™, APPS SCRIPT™ and APPLE SCRIPT™. In one example, MICROSOFT EXCEL™ includes more than four hundred and fifty built-in functions.

With all the added capabilities, spreadsheet applications have become substantially more complicated. The data manipulation and embedded programming language capabilities can be very powerful, but are complicated to learn and therefore they are used by a very small fraction of the spreadsheet application user base. Well over a hundred books and online videos have been published to help users understand capabilities of EXCEL™ alone.

With the world moving to the use of more and more data, and bigger and more complicated data sets, there is a need to enable the spreadsheet applications to handle many large and complex data sets. Regular users have not wanted to learn the complicated capabilities, such as those in MICROSOFT EXCEL™ Power Query and PowerPivot, required for importing moderate sized data sets into their EXCEL™ spreadsheets. Many users would love to be able to handle data sets larger than the row or column constraints of their spreadsheets and to be able to more easily manipulate the large and sometimes messy data sets. Most users want to do this while learning as few new commands as possible, with large external data set usage as simple as using small sets of data in their spreadsheets today.

The technology disclosed addresses ways for users to formulaically use a broad spectrum of numeric and text data not stored in a spreadsheet, including discrete and not discretely defined data and data with and without predefined data keys. The disclosed technology also works with very messy non-deduped, non-discrete, non-keyed data with which users all too frequently must contend. The disclosed technology includes external data usage commands that largely look like variants of the simple formulaic and function ways users use data already stored in spreadsheet cells.

With easy access to more data and much larger and more complicated external data sets, regular users want spreadsheet calculation capabilities that scale beyond one calculation per cell, can get beyond the complexity constraint of having to try to do very complicated calculations all in a single cell and can very simply handle multi-step calculations. In one example case, when processing five million pieces of data, a user does not want to do it with five million spreadsheet cells. Many users also struggle with the complicated syntax of the combination functions, e.g., SUMIFS, or COUNTIFS, spreadsheet suppliers have created to work within their constraint of a cell calculation must be done in a single cell. Regular users have also not wanted to learn how to use embedded programming languages that have capabilities such as loops that can solve the cell constraint problems.

The disclosed technology includes spreadsheet cell capabilities that allow users to perform scalable calculations in spreadsheet cells—calculations that would have previously required coding in an embedded software language. The technology disclosed includes multiple cells that can function as one cell, to simplify very complicated calculations, and various types of programming loops, including FOR NEXT, DO LOOP, and DO UNTIL, that users can employ in spreadsheet cells using cell data or non-spreadsheet cell (NSC) external data. The disclosed technology also includes ways to formulaically specify cells and named variables within cells—methods that make it easier for users to create and check complicated formulas. Additionally, the disclosed technology includes ways for users to show non-spreadsheet cell (NSC) data formulas, formulaic values and numeric values in cells and also while stepping through the progression of loops.

Formulaically Defined Use of Non-Spreadsheet Cell (NSC) Data

As users deal with larger and more complex data sets they find that those data sets may not fit into a typical spreadsheet because the overall size is greater than maximum 16,384 columns or 1,048,576 rows in a MICROSOFT EXCEL™ worksheet or the 400,000 cells in a GOOGLE™ Spreadsheet. However, many users find dealing with data sets that can fit into their spreadsheets overly complicated because the data sets have more dimensions or complications than are easily captured in a two-dimensional worksheet or even the third dimension of adding multiple workbooks. Therefore, users need a way to use data and potentially store calculation answers not populated in spreadsheet cells.

There are many capabilities for importing data into spreadsheets and moving the data out of spreadsheet cells. However, until our disclosed technology there is not a spreadsheet technology that makes handling all alphanumeric external data very similar to handling spreadsheet cell data. Our external data approach, which we call formulaic data, categorizes alphanumeric data into four different types and then has an approach specific to each to make it copy/paste, formula and function usable in ways similar to handling data that occupies spreadsheet cells.

Our Formulaic Data is differentiated as shown in FIG. 1 by whether the data has predefined data keys or not and whether the data is discrete or non-discrete. Discrete data is the simplest to deal with as once it is specified there is only one value and formulaic data specifier for discrete non-key data 163: the Formulaic Data name of the data element, as there is only one value for each Formulaic Data name. Any data variable that has a single alphanumeric value fits the definition. After describing the four data types, we will disclose how data in our formulaic data variable formats are used in spreadsheet cells in a manner very similar to spreadsheet cell data.

Discrete keyed data, after the key values are identified, has a single value and our Formulaic Data specifier for discrete keyed data 133 is the formulaic variable name and the keys and our Formulaic Data syntax is the variable name and the keys within parentheses. Weight(Exp,Dish,Date) is an example in which Weight is a database variable and Exp is an experiment number. Dish is a petri dish number and Date is a day when the weight is recorded, and for this keyed data once Experiment number is specified and the Petri dish number within that experiment and the date, there is a single weight value. If it turned out that there were multiple weight readings that day and no additional keys differentiating those, then this variable would be in the next category. However, in this example there is one value per day, so it falls into our discrete keyed Formulaic Data.

Our third data type is non-discrete keyed data 138, which includes any data, in a predefined keyed database, which does not have a single discrete value once the variable name and any keys are identified. Typically, the predefined data keys fall into this category and any data that is partially but not completely keyed to a discrete value. In this embodiment, we use a (! . . . !) formulaic designator syntax to show a user that this is part of a keyed data set but does not have a discrete value. The format Exp(! . . . !) also tells the user that this Formulaic Data variable is not a function of any keys because in this example it is the top level key. Dish (Exp,! . . . !) also examples a non-discrete key Formulaic Data set telling the user that the Dish variable is a function of the key Exp but once the experiment number is specified there is still more than one Dish number in the experiment (so it is non-discrete).

Finally, our last data type is non-discrete non-keyed data 168, which is generally the messiest of the data types because it is the least defined, and often the data has not been deduped and it does not have any unique identifier or predefined key that links subsets of the data. In this embodiment, our Formulaic Data syntax for this type of data is the formulaic variable name and the formulaic designator (!row!) that tells the user that this data has no identifier other than the row it resides within.

When external data is connected to our spreadsheet application all the alphanumeric data elements are categorized into one of the four Formulaic Data types described supra and our Formulaic Data syntax gets created. That process can be done by a person or a software application that determines the existence of predefined keys and discrete data sets. Processes like these are routinely done for data sets being connected to packaged software applications and a number of the data visualization applications to prepare data sets for their data mining and visualization tools. Our Formulaic Data differs in syntax and commands that facilitates usage in a way that mirrors methods in use for traditional spreadsheet cells.

While the examples described supra are of the numeric type, variables that contain alphas, blends of alpha data and numbers, dates, and other types of alpha, numeric or alphanumeric data fit well into the scheme and users often find alphanumeric blended data sets that are part text and numbers. The organization approaches of our Formulaic Data work as well for numbers, text and blends of the two.

Keyed Data Use Cases

For one use case, envision a full data set of laboratory cancer testing results which includes many hundreds of experiments each involving many animals, with daily measurements for periods varying from four months to over two years, generating a moderately large data set with close to two million rows. FIG. 2A shows a small subset of a moderately complicated large data set example: twelve lines 206 of a data set for one of many laboratory cancer testing experiments, for six distinct Dishes (20023, 20432, 20835, 20934, 21009 and 21011) 202. The scientists need to complete many analyses using the collected data to determine whether the treatments they are testing are having the desired outcome. Their analysis techniques include looking at results for individual animals, comparing test and control Dish sets, and understanding changes over time. On a smaller scale these analyses are doable in a spreadsheet, but not doable in a traditional spreadsheet when the user needs to analyze two million rows of data. The disclosed technology includes features with capabilities to make these analyses doable by a moderately capable spreadsheet user—super user skills not required. Disclosed technology features are described next, using the described use case data, after a brief description of traditional copy and paste capabilities for spreadsheets, which are mirrored by the disclosed technology, for external data. Users can similarly apply the disclosed feature set to additional use cases with large data sets that need to be analyzed.

Spreadsheet cells have some very powerful capabilities that users love, such as formulas, the functions that work in the formulas and the copy-and-paste function that allows users to replicate these formulas while retaining the data positional relationships of the data feeding cells. FIG. 2B through FIG. 2E display traditional copy and paste capability for data in a spreadsheet. FIG. 2B spreadsheet 252 shows a user-created formula visible in cell E3 254A. FIG. 2C spreadsheet version 256 shows user-copied cell E3 254B copied to cell E3 268 and cell E4 278, and as is normal spreadsheet copy and paste functionality with no $ limitations, the formulas shift positions down so that '=A3*B3+ A4*B4' in cell E3 254B becomes '=A4*B4+A5*B5' in cell E4 268 and '=A5*B5+A6*B6' in cell E5 278. Similarly, FIG. 2D spreadsheet version 284 shows copy and paste functionality of user-created formula visible in cell E3 254C copied to cells F3 to F5 294, and the formula relationships shift one column to the right and then zero, one or two rows down for the selected paste locations 294. FIG. 2E spreadsheet version 288 shows values 298 calculated using formulas 294 shown in FIG. 2D spreadsheet version 284.

External data must be prepared in a way that makes the data usable with spreadsheet cell commands, without the data needing to be in a spreadsheet cell. Today's tools either treat external data in columns and facilitate column-based simple function manipulation, require users to learn programming for further manipulation, or import data into spreadsheets and export analyzed data back out the spreadsheets. Existing spreadsheets do not make external data spreadsheet-cell ready for formulaic use or for formulaic copy and paste.

For external data, also referred to as non-spreadsheet cell (NSC) data, replicating traditional copy and paste capability for data in a spreadsheet is an important part of making the NSC data work like spreadsheet cell data. NSC data variables, when copied, need to generate results like those shown in FIG. 2E spreadsheet version 288 for formulas in cells E3 through F5 298. To do this, the NSC data needs to be available to users in a format or syntax that can function like spreadsheet cell data. Data availability, and importantly, the format or syntax of that Formulaic Data, also referred to as formulaically defined NCS data, is described next.

There are many ways to access data. Most database tools use queries of some form to access the data—on a personal device, a cloud application or in the cloud databases. Existing data tools typically expose the data in a data set—which may come from a data table, another EXCEL™ worksheet, or some other data source, by displaying the column headings, any key references, and possibly some indication of indexing. Most data search tools show either a list of the data set or a sample of the data. In contrast, formulaically defined NSC data includes formulaically defined variables that identify each piece of external data in a manner that can be easily used like cell data in formulas, functions and copy/paste.

Formulaic definitions are central to the use of NSC data in spreadsheet cells. The data shown in FIG. 2A is not sitting in spreadsheet cells but is instead available in computer memory that the spreadsheet is accessing. Therefore, the spreadsheet cell needs some way to access the specifically desired data and that access needs to be compatible with use in spreadsheet formulas and copying and pasting into other cells in which relationships can change as described relative to FIG. 2B through FIG. 2E supra.

To illustrate keyed formulaically defined NSC data for use in a spreadsheet cell, formula and/or functions, FIG. 3A displays a simple search example for accessing all data locally and making external data remotely available to the user. The user has selected a search drop-down or pop-up 306 and typed into search field 302 'T_51', to search and display all data sets related to or including 'T_51' in area 304. The user has then selected 'EXP_955' 324 which happens to be the data set excerpt with ten columns shown in FIG. 2A described supra. Data tab 348 shows a list of the data for 'Exp_955'.

Continuing with the search results discussion for this embodiment, data tab 348 shows two different types of our Formulaic Data: keyed discrete and keyed non-discrete data. The keyed discrete Formulaic Data is identified by the ! . . . !. 'Exp(! . . . !)' 316 shows the user that the data is part of a keyed dataset, that 'Exp' is not defined by other variables, and has more than one value. In the cancer test use case example there are many different experiments, so if a user specifies the variable 'Exp' they have not specified enough to get a single (discrete) value. The same is true for '(Dish(Exp,! . . . !)' 326 which is a function of the 'Exp' but that does not fully define Dish to a single value. So even though it is a function of another data set, because it is not fully defined by that data, it is a keyed non-discrete data set. In the example if the user specifies the data 'Dish' and then a specific 'Exp' (e.g., 955), they have not specified enough information to get a single value because there are more than one 'Dish' values for experiment 955, as FIG. 2A Dish 202 shows that there are six different dish numbers (20023, 20432, 20835, 20934, 21009 and 21011) for 'Exp' 955.

Continuing further with the search results discussion, Color_B' 356 is an example of keyed discrete Formulaic Data, that is, keyed data fully defined by other variables. Color_B' 356 does not show a '! . . . !' because once all the variables in the parentheses are defined there is only one piece of data. 'Color_B' is the Blue part of a Red Green Blue (RGB) color score taken each day for the petri dish growth in a cancer test. For each of the RGB measures, once the user defines all the formulaic data elements there is a single value. In this example, the information in the parentheses ( ) defines each piece of data. Each 'Color_B' data element is defined first by its 'Exp', then which dish from its 'Dish', and finally on what day it was read from 'Day', as shown within the parentheses for Color_B' 356 and tells the user what they must specify to get the data they want. With the parameters specified, the single piece of data is a formulaic keyed discrete data.

Figure 3B:
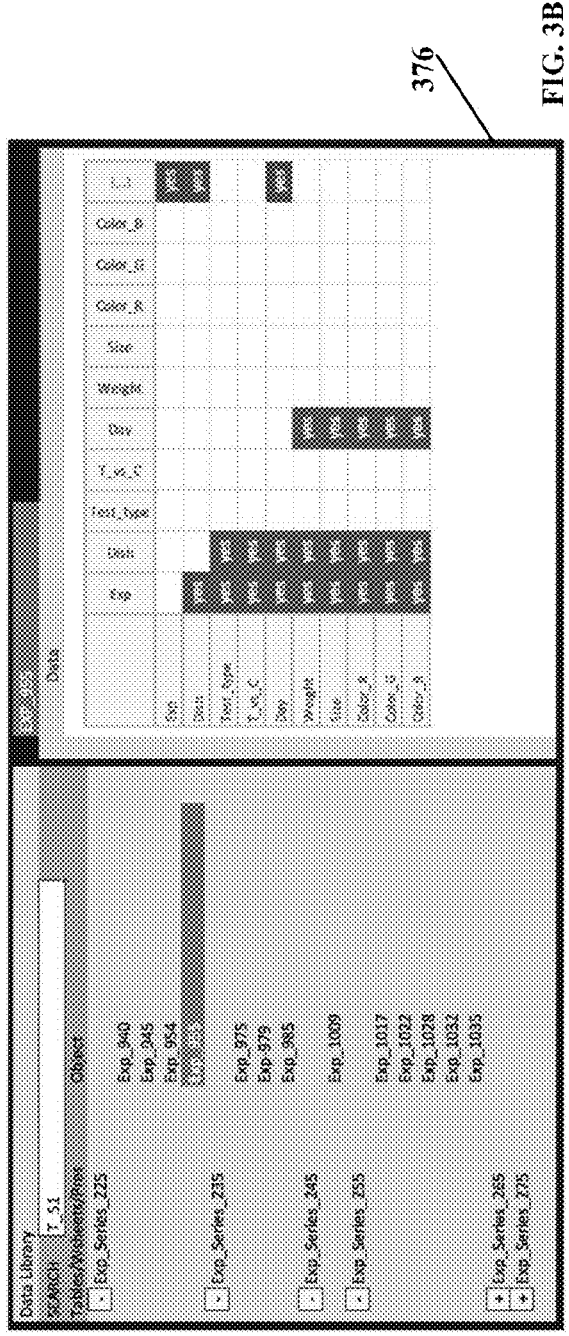

Users need an easy way to understand and use the data in cells and formulas. Since non-discrete data variables are less defined, users will often want to quickly see the range of values within them. FIG. 3B illustrates another way to show the user the types of data and any variables that define data, via a table of dependencies 376.

Users frequently need to know more about the data they are handling in order to know how to use the data in the disclosed spreadsheet cells. For quick visibility in a specific dataset, FIG. 3C displays the results when the user selects 'Day' 342 to view values for experiment 955. In box 362 the user sees that there are '366' values 344, sees the first eleven values '1, 2, 3, 4, 5, 6, 7, 8, 9, 10, 11' 352, and sees the scroll bar 354 which they could use to scroll through and display all the values. This view is different than a typical database view, as it is not showing part or all of the data set, and is instead simply showing the number and range of unique values. This serves the purpose of informing the user, so they can select the correct data in their calculations. For 'Day' the user realizes that for experiment 955 the days run from 1 to 366, and they can then check to view whether the data is sequential or can be put in sequential order.

Figure 3D:
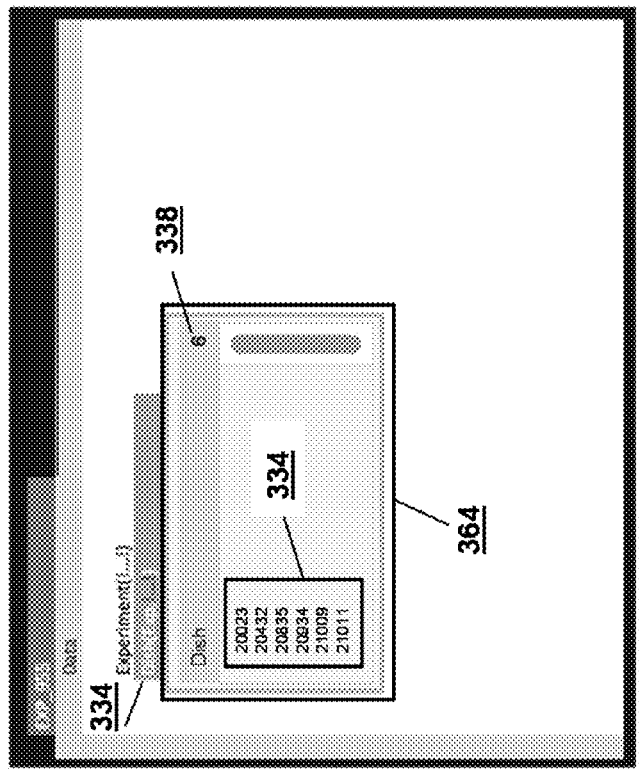
FIG. 3C, FIG. 3D and FIG. 3E shows some ways of looking at the Non-spreadsheet cell (NSC) Formulaic Data and availing it for easy spreadsheet usage
Figure 3C:
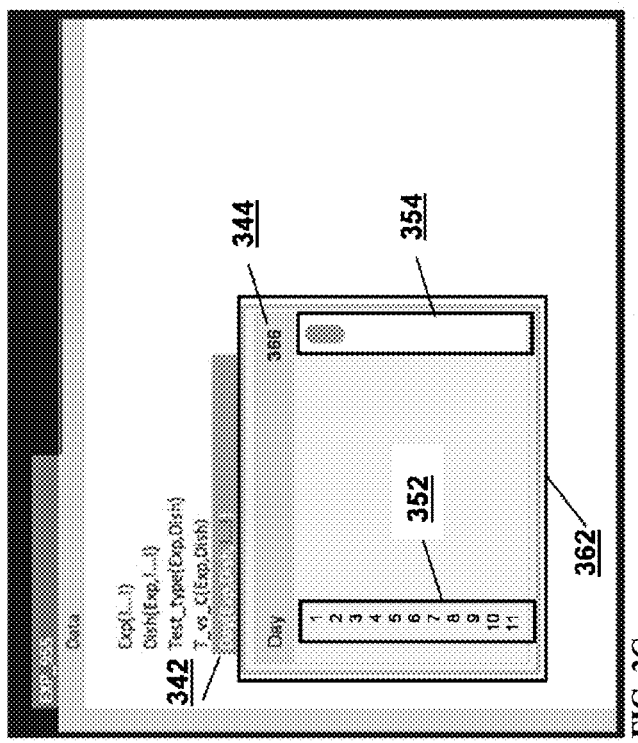

For an example of non-sequential data, FIG. 3D displays the results when the user has selected 'Dish' 334 to view the values for experiment 955. In box 364 the user sees that there are six values 338 and sees all six values 334. This informs the user that the values are not sequential, which could affect the way in which the user specifies those values to get the data they require. The user could also opt to see a sample or all of the data, which in some settings could be helpful.

Figure 3E:
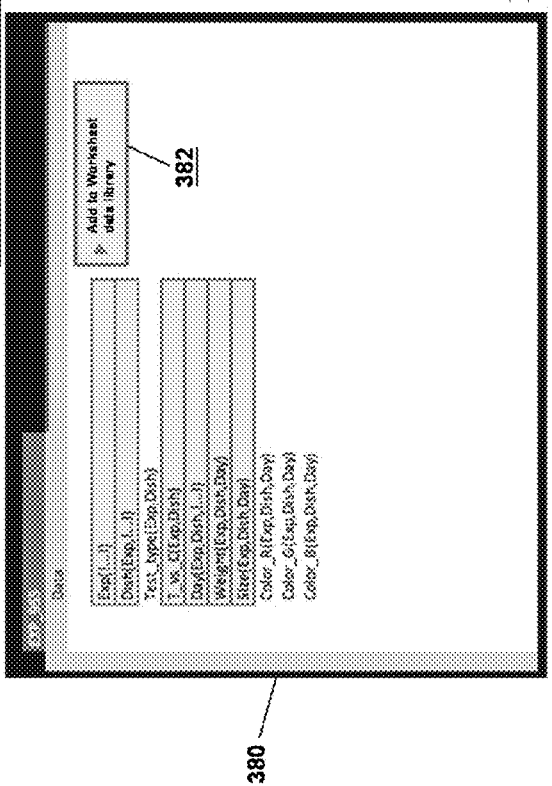

For ease of data usage, the user in one implementation of the disclosed technology can add the Formulaic Data labels to a worksheet data library. FIG. 3E displays one way that a user can highlight any or all of the data sets in data window 380 and add those data sets to a quick reference view in the worksheet so they can access them more easily. FIG. 3E shows the effect of the user selecting six of the data sets for Exp_955 and then selecting 'add to worksheet data library' 382. The user would also have the option to then prefix the labels, for example with Exp_955 or any other term they might find helpful for identification purposes. Alternatively, the user can keep the existing names as their labels, as shown in data window 380. The worksheet data library is usable as a quick reference for selecting variables to avoid the need to type or fully type the variables in cells or formulas.

Having defined our formulaic keyed data, we will now describe its use in our spreadsheet cells. Our spreadsheet cells allow users to put formulaic data variables in the cells and use them in formulas, functions and for copy/paste capabilities. We return to the data set partially shown in FIG. 2 and illustrate how to use formulaic data in spreadsheet cells. We start with a scientist focusing on Experiment 955, doing calculations on that data in their spreadsheet using NSC data from the cloud. The user would first like to figure out the change in weight of their petri dish culture each day of the experiment and they start simply, calculating in spreadsheet 400 as shown in FIG. 4A, as the title 421 says for one Dish, 20432, in Experiment 955. The variable involved in the calculation is a keyed discrete formulaic variable defined Weight(Exp,Dish,Day) 346 in FIG. 3A. The user knows to use this variable and to supply the experiment number, dish number and day number they want. In this example, they want the '% weight change' 432 each day, so they want the weight today, minus the weight yesterday divided by the weight yesterday. Therefore, they type the formula '=(Weight(955,20432,2)−Weight(955,20432,1))/Weight(955,20432,1)' in cell B5 442 and viewable in the formula display cell 401.

The scientists used '955' for the Exp, '20432' for the Dish, and either 2 or 1 for the Day, to retrieve the numbers they desire, to complete the calculation in B5 442 generating the value '2.17%". This allowed the spreadsheet user to get the values they wanted by simply creating a formula using our formulaic data to get the cloud data they wanted.

However, users will not want to manually fill out all the variables specifying each piece of data, so the user redoes the formula as shown in FIG. 4B replacing the Weight Day values with a capability supported by the disclosed technology: using spreadsheet cells to specify external data. The user replaces, in the cell formula, as shown in formula display cell 407, the Day value 2 with cell A5 446 and the both of the Day values 1 with cell A4 417 and 409, resulting in the same calculated value of '2.17%' in cell B5 439. Our technology then supports typical spreadsheet progressive copy/paste features so that when the user copies cell B5 to the bottom of their desired days of calculations it supplies the formulas, progressing as they would with a typical spreadsheet copy and paste of typical cell data. FIG. 4C examples this in the formula shown in formula display cell 457: cell B9 486 correctly uses Day values of A9 468, A8 469 and 477, after the copy and paste. Thus, the user can easily replicate spreadsheet cell calculations using NSC data in a manner with which they are familiar.

Working with NSC data is not always as simple as working with spreadsheet cells, so other capabilities the disclosed technology provides are required to simply and easily replicate the desired copy/paste data progression. One critical challenge is that data frequently is non-numeric, and even the numeric data does not always progress 1, 2, 3, 4, 5, etc. For example, Dish, in FIG. 2, is an example of numeric data that does not progress sequentially, as the six values progress non-sequentially as shown in 202 with the values '20023', '20432', '20835', '20934', '21009' and '21011'. When a user wants to progressively copy/paste non-sequential or non-numeric values, they need a different way to very easily automate their selection and progression.

Figure 5:
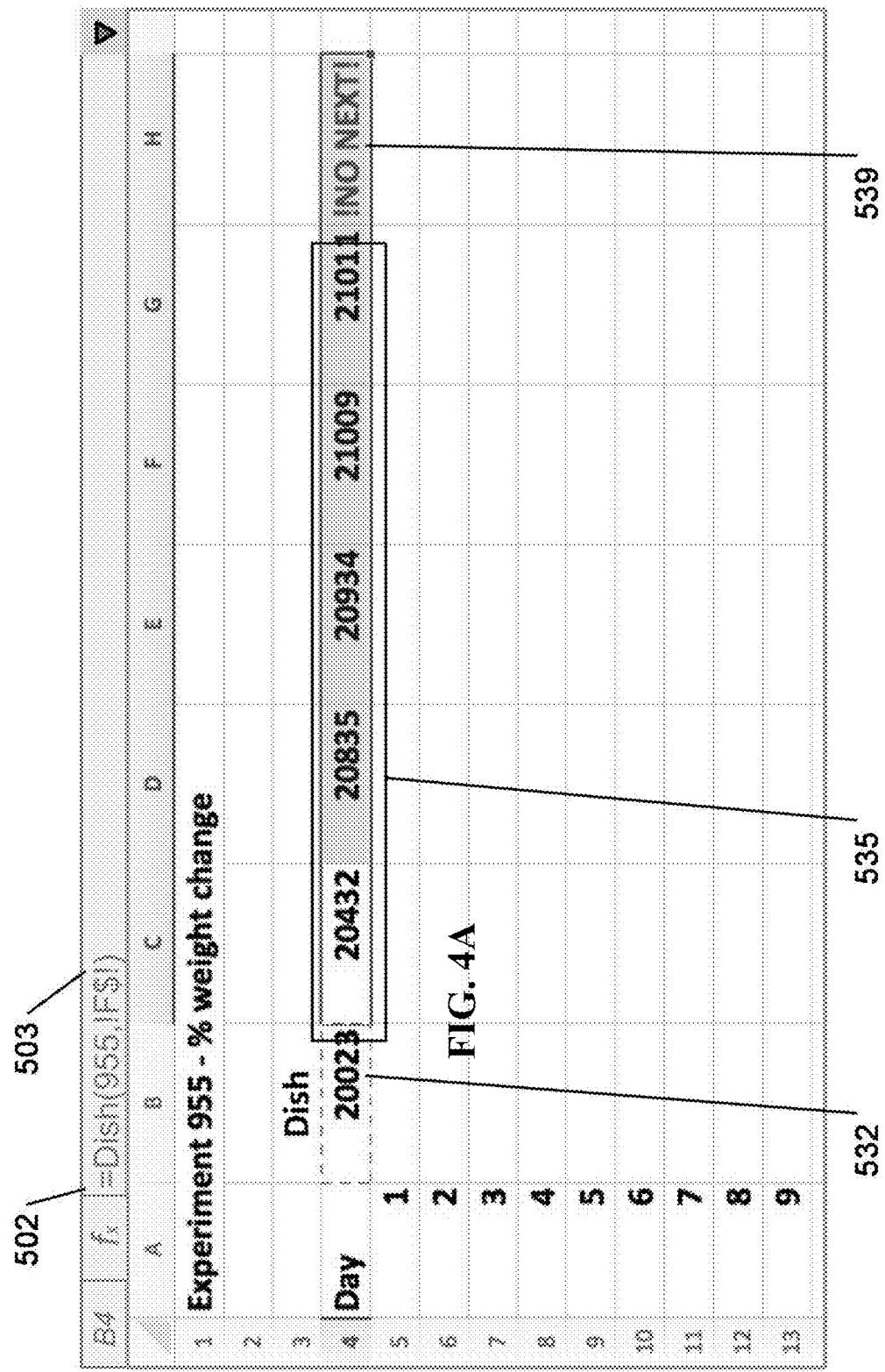
FIG. 5 illustrates the Formulaic Data FIRST command and its advantages in copy/paste

FIG. 5 examples one of our technologies that solves this problem. The user can quickly create column headings for the different Dishes in Experiment 955. Therefore in this embodiment, the user types into cell B4 532 the variable Dish(955,!F$!) shown in the cell formula box 502. This is the variable Dish(Exp,! . . . !). However, in this example the user has typed in one of the disclosed technology commands '!F$!' 503. In this implementation, the double exclamation marks !! of '!F$!' 503 signal the system that this is a special formulaic NSC data variable command. The 'F' within the !! tells the application to retrieve the First Unique Dish number, which in this example our system has organized from smallest to largest and therefore it is 20023 532. The $ after 'F' is using the typical spreadsheet copy/paste constraint nomenclature telling the application to progressively copy this variable horizontally but to not change it if the user copies it in a row above or below this one.

The value of using this command becomes evident when users copy that cell to the right and get the second unique, third unique and so on Dish values as shown in cells D4, E4, F4, G4 535. Incrementing by the unique values is a very important option, as this data set like many has many replications of each of the Dish value and in this situation the user only wants the unique values not listing of all the repetitive values. This progressive command makes the use of non-sequential NSC data extremely easy. If the user mistakenly copies cell B4 532 too far into cell H4 a message '!NO NEXT!' 539 tells the user there are no further unique Dish values. This makes it easy for users to very quickly do copy and paste and know when they have gone too far.

Figures 6A, 6B:
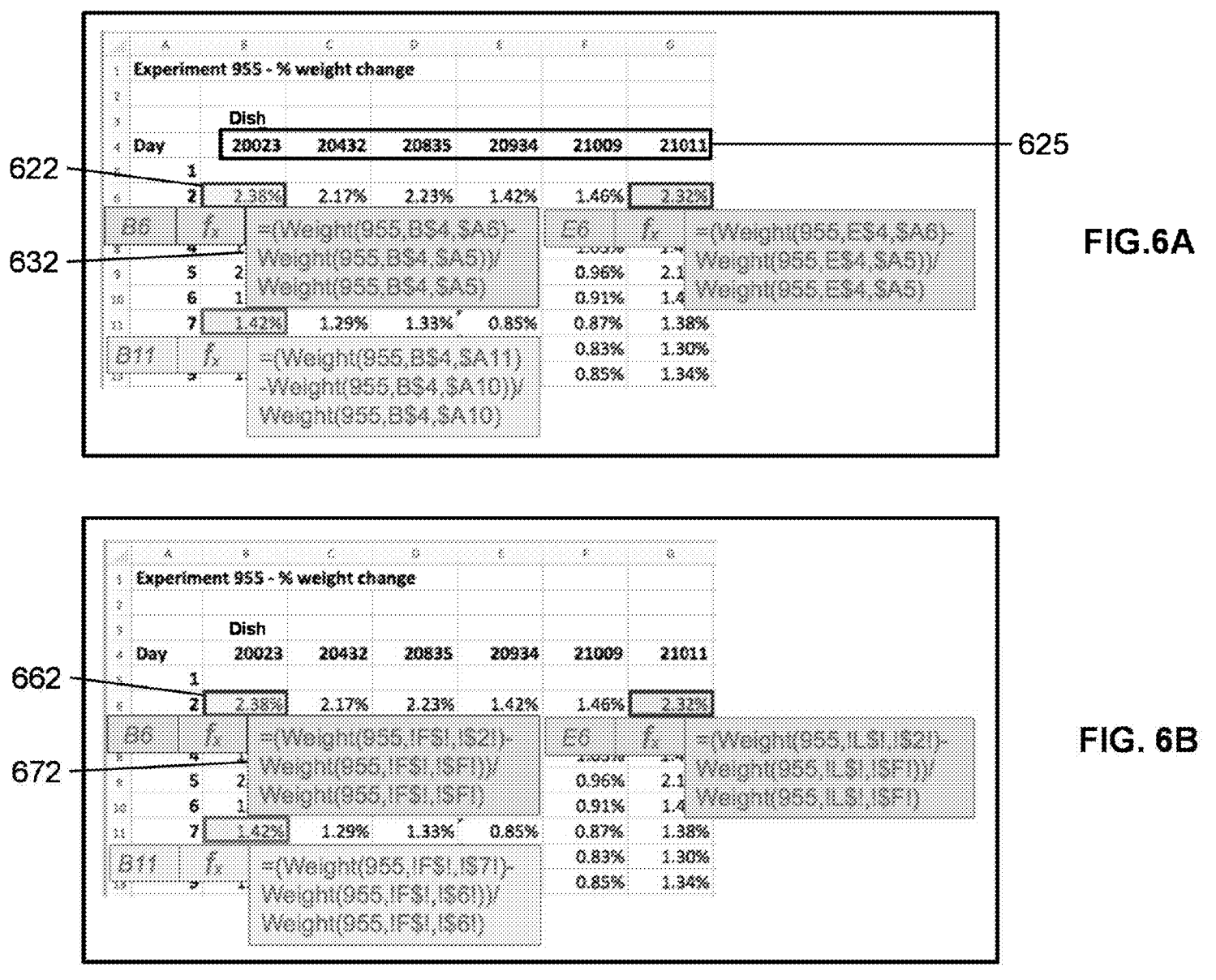

The FIRST unique command '!F!' has a comparable LAST unique command which, in this implementation, is designated !L!. These two commands are very easy for users to understand and allow users to easily do manipulation and calculation of complete formulaic NCS data sets. FIG. 6A examples this by writing a single formula in cell B6 622 with formula 632, which is then easily copy/pasted for all the dishes and all the days of the experiment. The user has used cell values 625 for the Dish number and the cell values in column A for the Day values in formula 632, as shown in FIG. 6A. Alternatively, FIG. 6B illustrates the user's choice to write the formula in cell B6 662 with formula 672 using the FIRST and SECOND unique (!$2!) commands and thereby not needing to use any cell values. These commands in copy/paste will then increment all the way to the LAST command before displaying the '!NO NEXT!' like that shown in 539 of FIG. 5. Both approaches give the same results and are equally easy for the user to copy and paste to fill out all the Dishes for all the test days.

The FIRST and LAST formulaic data commands are particularly helpful when working with our implementation of NSC data version of the typical functions. For example, if our cancer researcher scientist wants to calculate a quick average weight change per day over a number of dishes and experiments in which the number of days varied, FIRST and LAST capabilities will be very useful. Using FIRST and LAST commands make it extremely easy to write a generalized formula summing all the weight changes and then dividing by the count of days for each dish and each experiment, using example formula:

=SUM(Weight(Exp,Dish,!$F$!):Weight(Exp,Dish,!$L$!))/COUNT(Weight(Exp,Dish,!$F$!):Weight(Exp,Dish,!$L$!))

The formula can be copy and pasted to be used with any number of different experiments with vastly different numbers of days, and will generate the correct value because the FIRST and LAST commands will accommodate the number of days differences between different experiments and get all the correct NSC data for the calculations.

With keyed data our technology makes it easy for users to handle data-intensive calculations in a single formula. FIG. 7 examples a single formula working through multiple keys in its calculations. Using the formulaic defined NSC variables, users are readily able to write formulas with functions, like SUM, COUNT and most of the other spreadsheet functions that work through multi-dimensional data sets. In this example, the summations and counts go across all the dishes and all the days. In the formula for B4 746, the SUM and the COUNT of variable Weight(Exp,Dish,Day) goes from Dish and Day values of !$F$! to ! $L$!. The user added both $ signs to the FIRST and the LAST commands so they could then copy B4 to cells and not have the starting and ending point change, just as the $ signs would have done in a regular spreadsheet. Then they can create the formulas they want in cell B5 through cell B8 using a copy and paste feature and replace weight with the desired variable. In the example formula B8, the substituted variable Color_B 776 is visible. For the disclosed technology, users could almost as simply handle more complicated data sets with even more keys and therefore dimensions to the data.

Non-Keyed Data Use Cases

Non-keyed discrete data with cells that can handle formulaic NCS variables present no problems. Since there is only one value for each variable, the disclosed system pulls and uses that value when a user employs the variable. Non-key non-discrete data presents many issues to contend with as the disclosed system, like any other system working with this type of data, needs to be able to handle non-deduped data with no single identifier for a row or any piece of data. As we described relative to FIG. 1, the disclosed Formulaic Data identifier or designator, in this embodiment, for each variable in a non-keyed non-discrete data set is (!row!), which tells the user they are dealing with non-keyed, non-discrete data.

Example non-keyed, non-discrete data is shown in FIG. 8A, which displays a small subset of a cloud data table of daily donations for a charity organization. The data has no single identifier for each row and even has multiple entries for what appears to be the same person on the same day 825 and 835. The data set is incomplete as many rows are missing data elements such as an address, telephone number or email. Typically, when working with this type of data a user will want to better understand the dataset quickly, including looking at the data fields shown in FIG. 8B, to view what data elements they have and confirm that the data is non-keyed non-discrete data, as they see with the (!row!) Formulaic Data designator. The user can view the data sets of interest, in this example looking in FIG. 8C at the states and countries represented in the data set. Knowing, in summary form (unique values) and in detail (all values) if needed, what is in the data allows the user to utilize the disclosed formulaic NSC data variables to manipulate, sort and set up calculations in their spreadsheet cells. The data can be organized by the different values within a field, such as by the unique values found in the StateCountry field: 103 States and Countries 878 shown in FIG. 8C.

Figures 9A, 9B, 9C, 9D:
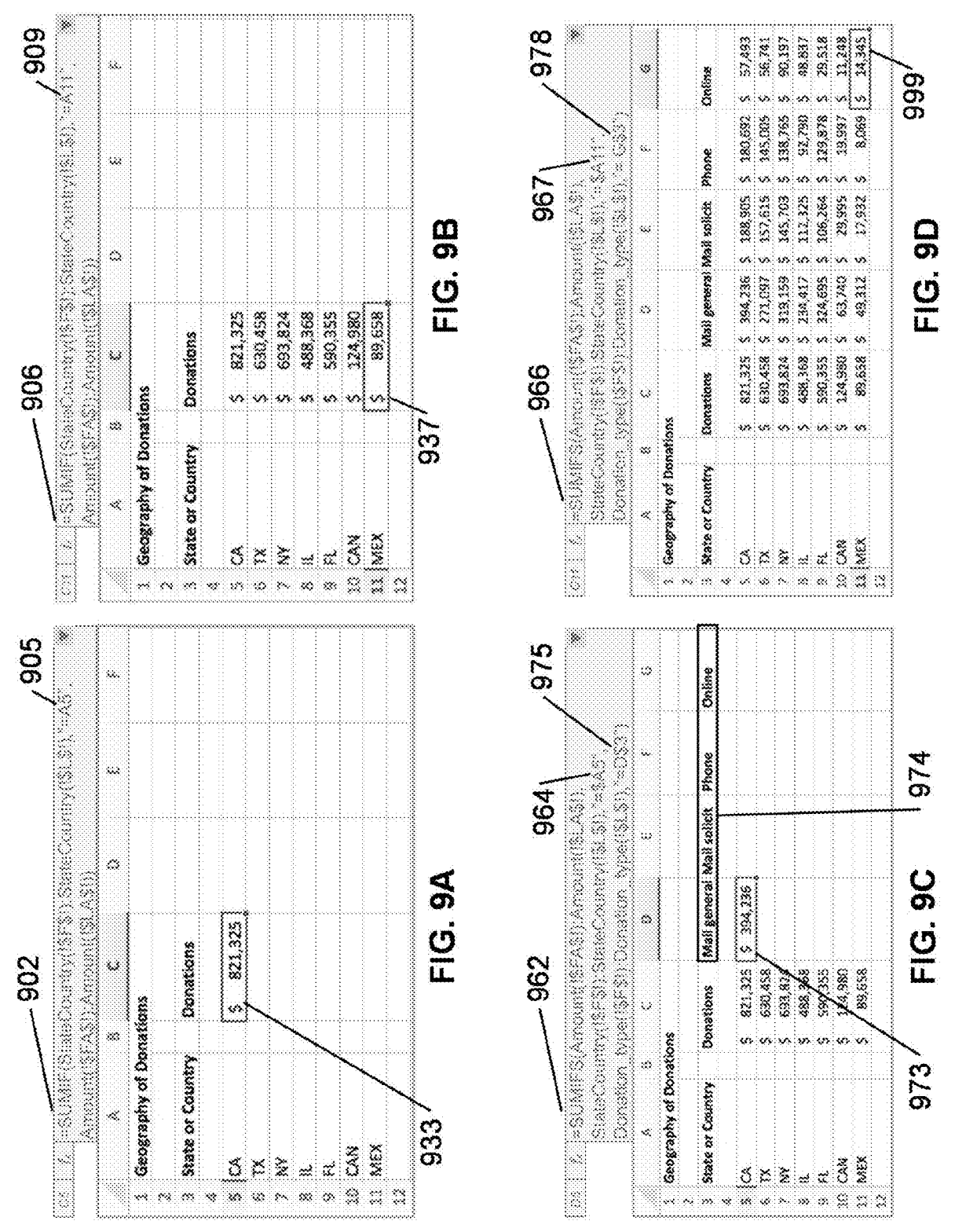

FIG. 9A examples a user utilizing the full cloud dataset of FIG. 8A to calculate the donations they have received from the states and countries of their choice. In cell C5 933 the user writes formula 902, employing the disclosed formulaic NSC data version of a SUMIF function using two non-keyed non-discrete formulaic variables, 'StateCountry' and 'Amount', and the disclosed FIRST and LAST unique (!F! and !L!) and all (!FA! and !LA!) commands. The FIRST and LAST all commands are used for 'Amount; because in this calculation they want to sum every value of Amount, not just the unique values. This is done using cell A5 905 as the conditional criteria so that the formula not only calculates the correct values using the cloud data but can be easily copy and pasted for use with other States and Countries. In FIG. 9B the user has copied the formula created in FIG. 9A to cells C6 through C11 and through use of the disclosed Formulaic Data and Formulaic Data spreadsheet functions, using the same convention of $ constrained copying, found in normal spreadsheets, the user very easily copy the calculation to the six additional states and countries in cells C6 to C11 937. The formulaic data and formula will have replicated based on the $ constraints so that the A5 905 in cell C5 933 will have changed to A11 909 in the formula 906 for cell C11 937.

FIG. 9C further examples using non-keyed non-discrete NSC data in spreadsheet calculations. The user adds calculations to break down the donations by type and can see that there are four types, which they add to spreadsheet cells D3, E3, F3 and G3 974. The user writes a generalized version of a SUMIFS function 962 into cell D5 973 using the appropriate state and country cell '$A5' 964 and the appropriate donation type cell 'D$3' 975 as the respective conditional criteria. That formula is then ready for simple copy and paste to fill in the other donation breakouts as shown in FIG. 9D. Using what feels to the user like a pretty normal spreadsheet copy and paste, the Formulaic Data supplies the correct formula 966 using the right StateCountry conditional criteria '$A11' 967 and the correct donation type conditional criteria 'G$3' 978 for cell G11 999. This use case example begins to show the power of the disclosed Formulaic Data variables for even the messiest of alphanumeric data types. Because non-keyed non-discrete data is harder to deal with, users will greatly benefit from the ability to easily do more complicated calculations, including multi-cell and LOOP calculations, which we are about to discuss.

While we have only exampled a small set of the functions within a typical spreadsheet, the disclosed formulaic NSC data approach is applicable to most spreadsheet functions. However, as mentioned supra, when users combine more complicated functions they often run into challenges of comfortably fitting it all in a cell. Since the disclosed capability enables users to take on large data sets in spreadsheet cells it is worthwhile to describe options for simplifying spreadsheet complexity.

Complexity Reduction Multi-Cell Use Cases

One function that tends to add complexity is the IF statement, particularly when it has more than one conditional. Some users can handle thinking through all the imbedded IFs within a single cell and all the syntax and parentheses that brings, while others would prefer to view those IFs more simply. An example of this complexity is described next: a user is classifying what type of information is in a cell as to whether it contains a formula, an error, is blank, is text, is a number and if so whether it is positive, negative or zero. That determination would require the following formula, which might be understandable by some people. =IF(ISERROR(A27)=TRUE, "Contains an error", IF(ISFORMULA(A27)=TRUE, "Contains a formula", IF(ISBLANK(A27), "Cell is blank", IF(ISTEXT(A27)= TRUE, "Cell contains text", IF(A27>0, "Positive number", IF(A27<0, "Negative number", "Zero"))))))

However, others may find it a lot easier if they could break the logic down into bite sized chunks that are much easier to create, look at and verify are correct.

FIG. 10A shows a spreadsheet with a capability that allows users to layout complex logic in bite sized chunks within the spreadsheet cells, using a disclosed RUN function. That function allows the user to write out their logic using as many cells as they would like. In this example, the RUN function gets fed one value to use within the RUN function cells and those cells are accessed through the formula 'CRUN{$D$3}|A5:|' 1012 in cell B5 1033. The CRUN is used to call the RUN cells, the '$D$3' in the formula 1012 tells the starting location of those RUN cells and because of the $$ will not shift when copied. The { }, within which the $D$3 sits, were selected in this implementation to be the designator of location. In another implementation, a different designator can be employed. 'A5' in formula 1012 is the input value passed to the RUN function to use and, in this embodiment, to put between the bars ‖ as a way of marking any inputs and outputs. The inputs are located on the left side of the colon within the bars ‖ and the output or outputs are located on the right side of the colon. If, as in this example, the user puts nothing on the right side of the colon within the bars ‖, then the final value of the RUN statement is returned to the CRUN call statement. In this example, the user has written formula 1034, composed of five simple IF statements, with a RUN start and END replacing the formula described earlier. They have replaced the default naming |input1:| of the data passed to the cell with 'value' 1025.

After the RUN function 1034 is set up and the first CRUN 1033 written, the user is ready to replicate it. Since the CRUN 1012 was written to work generally, the user need only copy and paste the CRUN in cells B6 to B12 generating their cell results in 1043.

The advantage of this approach increases when the value being passed to the RUN function is a more complicated NSC variable, such as 'LAB_RESULTS_COLUMN_2(955, 20023,!F!)' used in one of the previously mentioned cancer lab tests. In that situation, the single line formula for categorizing the data content looks like:

=IF(ISERROR(LAB_RESULTS_COLUMN_2(955,
20023,!F!))=TRUE,"Contains an error",IF(IS-
FORMULA(LAB_RESULTS_COLUMN_2
(955,20023,!F!))=TRUE,"Contains a formula",
IF(ISBLANK(LAB_RESULTS_COLUMN_2
(955,20023,!F!)),"Cell is blank",IF(ISTEXT
(LAB_RESULTS_COLUMN_2(955,20023,!
F!))=TRUE,"Cell contains text",IF(LAB_RE-
SULTS_COLUMN_2(955,20023,!F!)>0,"Posi-
tive number",IF(LAB_RESULTS_COLUMN_2
(955,20023,!F!)<0,"Negative number",
"Zero")))))

However, using the RUN function there would result in no complexity change of the RUN cells 1012 written by the user in FIG. 10A. FIG. 10B shows RUN function cells 1074 and results 1083 are unchanged for a situation in which the same data used in FIG. 10A is instead available in the cloud and accessed using our formulaic data variables. The CRUN, shown in formula box 1062, for cell B5 1073 has changed, passing the value 'LAB_RESULTS_COLUMN_2 (955,20023, !F!)'.

The RUN function can be used for all types of formulaic calculations and can be further generalized to add much greater flexibility for ways it can be used as well as simplified in its access and usage. Many users find working with a series of cell alphanumeric labels in formulas somewhat confusing. Without labeling it can be challenging to keep straight what is going on in each cell calculation. In some ways, because the disclosed formulaic NSC data typically has descriptive labels, it is more understandable for some users. We describe an added disclosed capability, named variables for spreadsheet data, to help those users who find labels easier to work with than cell alphanumeric labels.

Figure 11A:
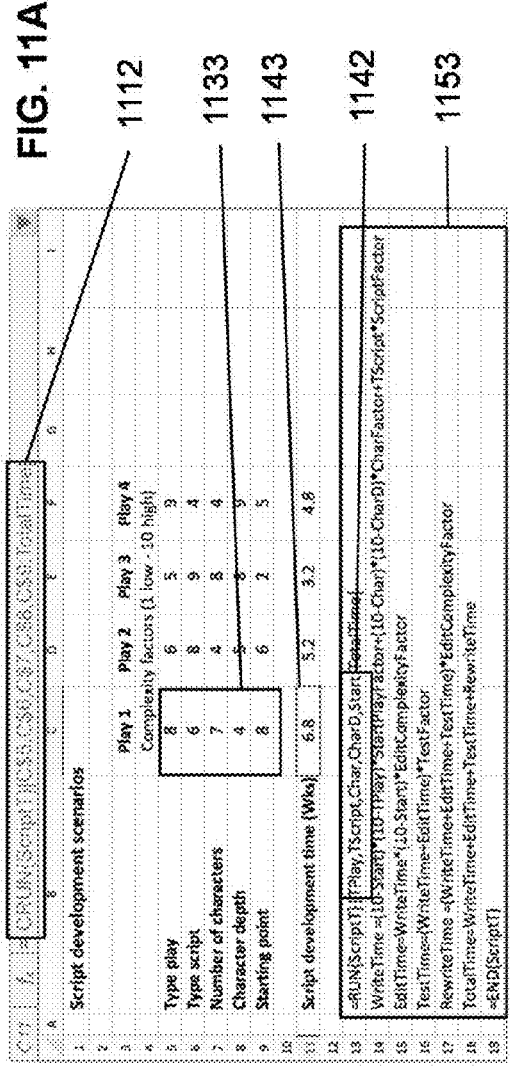
FIG. 11A and FIG. 11B example the use of Named Variables and our RUN and CRUN functions passing both input and output variables.

FIG. 11A, displays an example of the use of named variables and more RUN cell generalization using a college theater studies group script development time spreadsheet. The group subjectively estimates five different complexity dimensions of developing a script, 1133 and then uses those values in a series of calculations 1153. The complexity dimensions 1133 'C$5,C$6,C$7,C$8,C$9' are sent in a 'CRUN{ScriptT}', shown in formula box 1112, for cell C11 1143 in which the RUN has been named ScriptT. The user elected to create a number of named variables (WriteTime, EditTime, TestTime, and RewriteTime) for the calculations, used some named variables calculated elsewhere in the spreadsheet (StartPlayFactor, CharFactor, ScriptFactor, EditComplexityFactor, TestFactor) and used named variables for the values 1142 passed to the RUN (TPlay, TScript, Char, CharD, and Start). The RUN then returns the value TotalTime, to the CRUN which is shown in cell C11 1143. In this embodiment, the user simply elects to create a named variable by selecting a menu button, as well as anything typed after the colon: within the bars ‖ in the RUN statement if not a cell alphanumeric is then created as a named variable. They have used those named variables to make the equations within the cells much easier to understand and, for many users, therefore easier to create and debug.

Figure 11B:
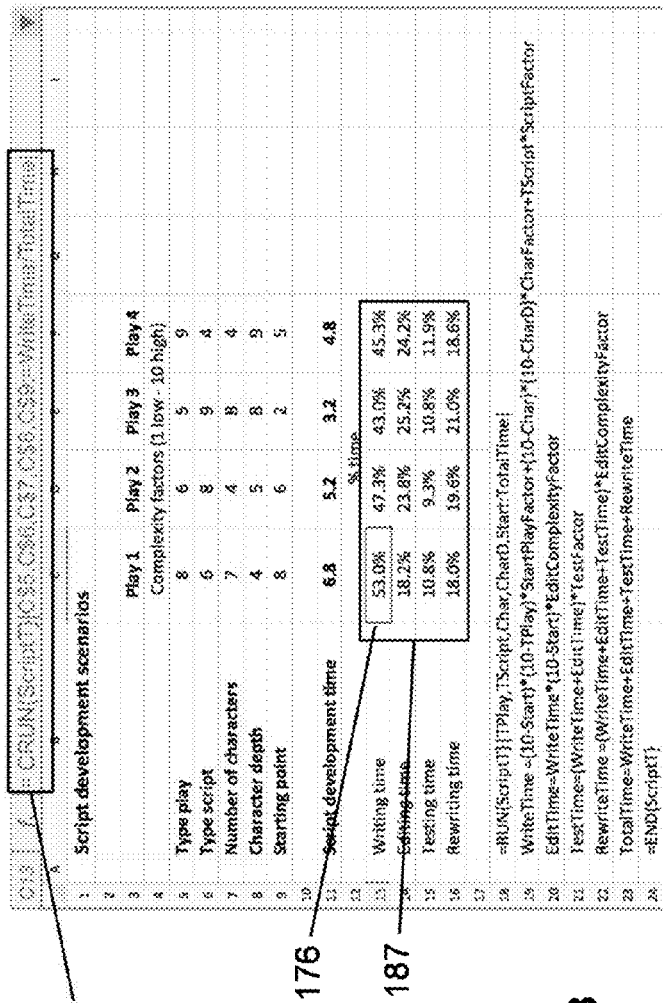

FIG. 11B shows an added benefit: returned values from the RUN can be used in calculations as shown by '=Write-Time/TotalTime' in the CRUN formula 1166 in cell 1176 Those CRUN formulas can then be easily copy and pasted as was done with cell C13 1176 to the rest of the cells in selected block of cells 1187 with some small edits replacing the 'WriteTime' in the '=WriteTime/TotalTime' with the respective time EditTime, TestTime or RewriteTime. These multi-cell RUN and named variable capabilities can also be used with NSC data variables. In many ways, the NSC variables already look more like named variables and with reasonably descriptive data names make spreadsheet cell formulas easier to understand.

Multi-cell RUN functions can be used with many if not all spreadsheet functions. They also eliminate a large problem users have with copying very complicated formulas, where they do not have exactly the same cell relationships on the values used for the target cells for the copy. The user must then correct the formula remapping the relationships of the values used in the cell which can be a challenging process in a complex formula. RUN functions do not have that problem because the user gets to select exactly what to match to which input and can get those inputs from wherever they are located without affecting any of the formulas in the function. This also makes RUN functions much more easily reusable in other parts of the spreadsheet or even other spreadsheets and much easier to understand if named variables are used.

LOOP Use Cases

Loops, such as FOR NEXT, FOR EACH NEXT, DO LOOP, DO WHILE, DO UNTIL, are a very powerful capability that you find in the programming languages sitting within the spreadsheet applications, but not available in the spreadsheet cells themselves. Since few users learn and use those programming capabilities, bringing that powerful capability to the regular users holds exciting potential. Our technology does that with simple-to-use spreadsheet cell capabilities and new commands that mirror traditional spreadsheet ones. Like the disclosed RUN function, one embodiment of our LOOPs will involve linking together the operation of a number of cells for sequential or specified operation, such as GOTO.

We start by exampling a very simple LOOP in which the number of iterations is specified and it starts the next iteration when it reaches the associated NEXT. This same approach can be modified to do FOR NEXT, FOR EACH NEXT, DO WHILE, DO UNTIL, and other loops. The reader can readily understand that the same general principals apply to those variants.

Figures 12A, 12B, 12C:
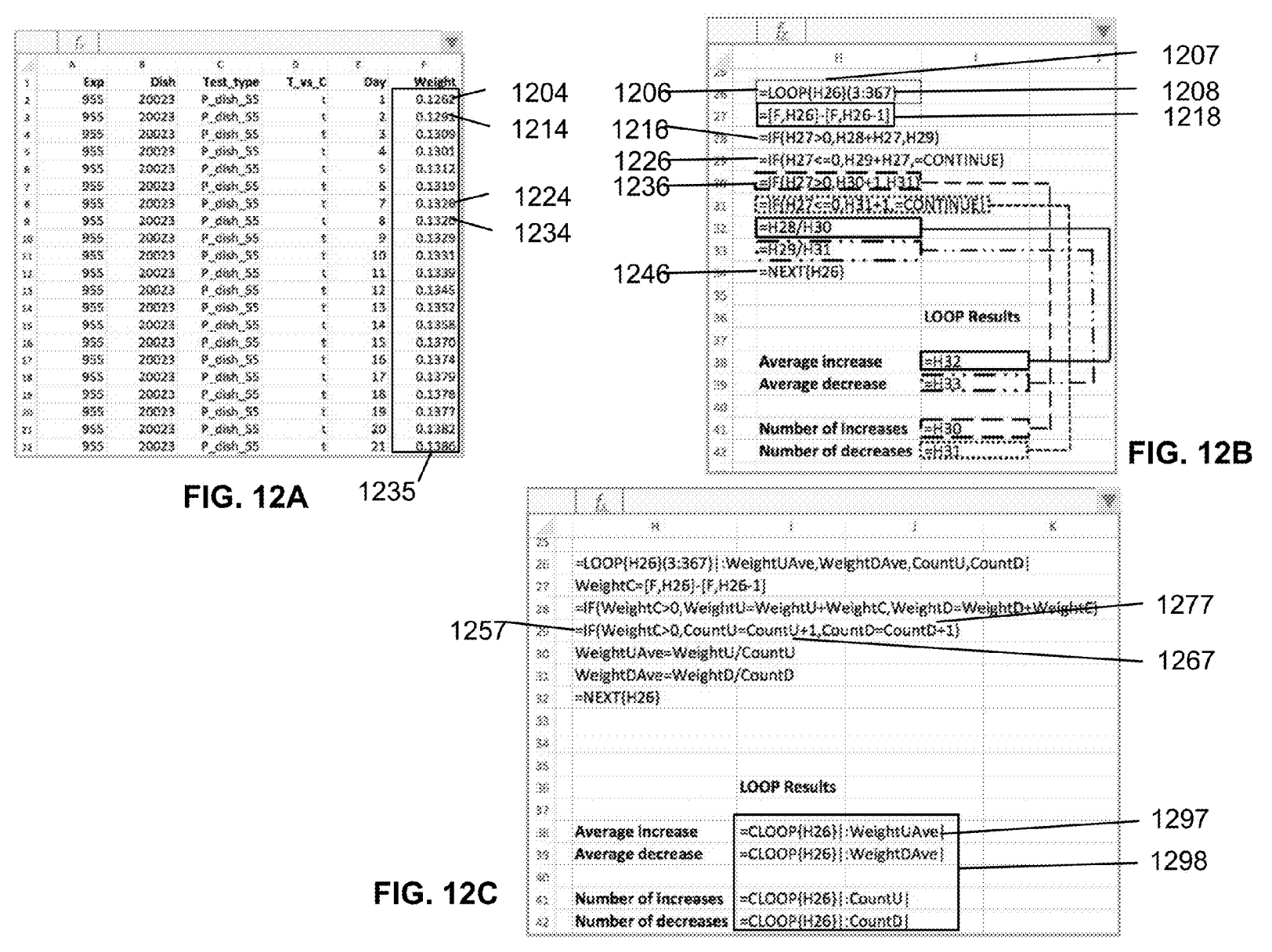

FIG. 12A shows a small amount of the data exampled in FIG. 2A: example test data from cancer researchers moved into spreadsheet cells. FIG. 12B and FIG. 12C illustrate calculations that work with the Experiment 955 petri dish weight measurements 1235 in column F of FIG. 12A.

The researcher conducting petri dish tests wants to understand, for days when the petri dish sample gains weight, what is the average amount of weight gain. Likewise, on days when the petri dish sample does not change or loses weight, what is the average amount of change? Finally, the researcher wants to know how many days fell into each bucket, weight gain or no gain/loss during the year of measurements. A LOOP can very simply do these and much more complicated calculations. As shown by this example, the disclosed technology, which makes it easy for users to construct all kinds of LOOPs within spreadsheet cells, and thereby opens much more advanced computing to a large number of users.

FIG. 12B examples a LOOP and is constructed in a different part of the spreadsheet, but could have been next to the data or in a different workbook. In this example, the LOOP is started in cell H26 1206 where the LOOP command has been written. The user starts the LOOP with the value '3' and ends it with '367' all within parentheses ( ) 1208. In this implementation of the disclosed technology, numbers separated by a colon are used, within parentheses ( ), as the syntax for the LOOP starting and end point. The LOOP variable, used in the calculations to get the iteration value, defaults to the cell in which it was started, in this example H26 1207. The user can elect to change that variable name but, in this example uses the default of H26. That expression could be created in different ways and the increment could also be set to be other than 1, but in this implementation defaults to an increment of 1. In many programming languages, the loop statement might go more like i=3 TO 367 and the loop could be set up to operate in that way, but instead in this embodiment we opted to make it look more like spreadsheet commands, using cell numbers or user selected names set in brackets and parentheses.

Continuing the description, the LOOP function steps through all the cells until the NEXT 1246 in this case completes '367'. Once the user creates the LOOP cell 1206 in this implementation of the application the NEXT{H26} 1246 is automatically generated. The user can move it to wherever they desire, here cell H34 1246. In cell H27 1218 the user employs an important new technology that we call formulaic cell designators. A LOOP, using data within the spreadsheet, needs to access different cells within the spreadsheet as the LOOP iterates. The formulaic cell designator, in this implementation, is indicated by square bracket parentheses [ ] and has a comma between the designation of the column and the designation of the row. It is a very simple way for the user to setup their desired movement through the data. For the first iteration of the LOOP the first cell designation in the calculation in cell H27 1218 will be [F,H26] where 'H26' has the value 3. Thus [F,H26} will be F3 thereby getting the value '0.1291' 1214 from the dataset in FIG. 12A. The second formulaic cell designator in cell H27 1218, the one after the minus sign, is '[F,H26−1]'. For the first iteration where H26 is 3 is [F,3−1} gives F2, thus getting the value 0.1262 1204 from column F in FIG. 12A.

In this LOOP example, the iterations will continue to move down column F in FIG. 12A so that by the LOOP iteration 8, when H26 1207 equals 8 the first formulaic cell designator in H27 1218 '[F,H26] will be cell F8 retrieving value '0.1320' 1234 from FIG. 12A and the second formulaic cell designator in 1218 '[F,H26−1] will be [F, 8−1] thereby F7 and retrieve value '0.1326' from cell F7 1224 in FIG. 12A. The formulaic cell designators can also move up rather than down and can move both side to side in columns to retrieve cell values as desired. There are other ways to set up the syntax for the formulaic cell designators: no matter the syntax the key is to be able to select how to change one or both of the column and row designators as the LOOP progresses.

Further continuing the example description, the next cell H28 1216 introduces another important new spreadsheet cell capability, a cell we call an increment cell which can add or subtract to its self. In the IF statement in cell H28 1216, if H27>0 then the action is to add H28+H27. Since we are in cell H28 that is adding a value to itself. This is a common programming language command used to keep totals that here is being engineered to work in a spreadsheet cell. It is not traditionally used in any of the current spreadsheets and if a user does it they get an error message of a circular reference failure. It will be important to loop calculations and therefore is a new and important cell capability.

Another new spreadsheet cell capability, the CONTINUE function, tells the cell to progress to the next cell, as introduced in cell H29 1226. This function is usable with a number of new functions including the GOTO( ), which allows the user to move the calculation from where it is to the cell identified within the parentheses ( ) following the GOTO. A GOTONEXT or a NEXT function can be an easier way to trigger the next iteration of the loop. The user may also insert an ENDLOOP command which completes the loop at whatever point it is encountered. All of these disclosed capabilities are common in programming languages but not as functions working within spreadsheet cells.

Continuing with the example shown in FIG. 12B, the four cells, starting with H30 1236 to H33 are set up to calculate the desired outputs of the LOOP. The values on the final iteration of the LOOP persist until the next run of the LOOP and those results are displayed in cells I38, I39, I41 and I42 (with the different lines connecting where the values are generated). Completion of the loop does not always mean that all the iterations are completed, as functions like GOTO and ENDLOOP can alter the completion. However, in this example because no functions or commands are included which would prematurely complete the loop, the values in cells H30 to H33 and the resulting values in cells I38, I39, I41 and I42 will contain the values after iteration 367 is complete.

Another important disclosed feature of the spreadsheet loop worth noting is the zeroing of all the variables before the next iteration. In this implementation, changes to values 1235 or changes in some other cell involved in the calculation will trigger a recalculation. That recalculation needs to go through the entire loop and start with values, particularly of the increment cells, that are zeroed.

Different people find different approaches easier and there are many different situations, and the disclosed loop capabilities can be used with different approaches. FIG. 12C shows an example that sets up the loop of FIG. 12B using named variables. This approach caters to those people who find it easier to lay out calculations if they can see labels for the values they are calculating. Many users would find it is easier to pick up the spreadsheet created by another user and understand what is doing if it had named variables, and using named variables can also reduce the number of cells, because more than one value can be calculated in a single cell. For example, the LOOP in FIG. 12C uses seven cells while the same outcome in FIG. 12B requires nine cells. The LOOP in FIG. 12C does require using the CLOOP function, essentially a call command, very similar to the CRUN function, getting outputs from the LOOP or a WRITE function, as described infra. In this implementation, cells I38, I39, I41 and I42 1298 use a CLOOP command identifying the correct loop via the cell it starts in, H26 1206 in the '=CLOOP{H26}' statements and after the bar and the colon, specifies the output value selected for each respective cell calling the LOOP, which in cell I38 is 'WeightUAve' 1297.

FIG. 12C also introduces a named variable variant of the increment cell. Specially, a variable that can be added to its self to compute a running total. FIG. 12C includes two increment variables, 'CountU' 1267 and 'CountD' 1277 that do the incremental totaling in cell H30 1257 based on the IF statement 'CountU=CountU+1' or 'CountD=CountD+1'. Since there are not named variables in spreadsheets, there is nothing like this in a spreadsheet context. The disclosed increment cells and increment variables are important for simplifying calculations for users for doing counts and keeping totals running throughout the operation of the LOOP.

Figures 13A, 13B, 13C, 13D:
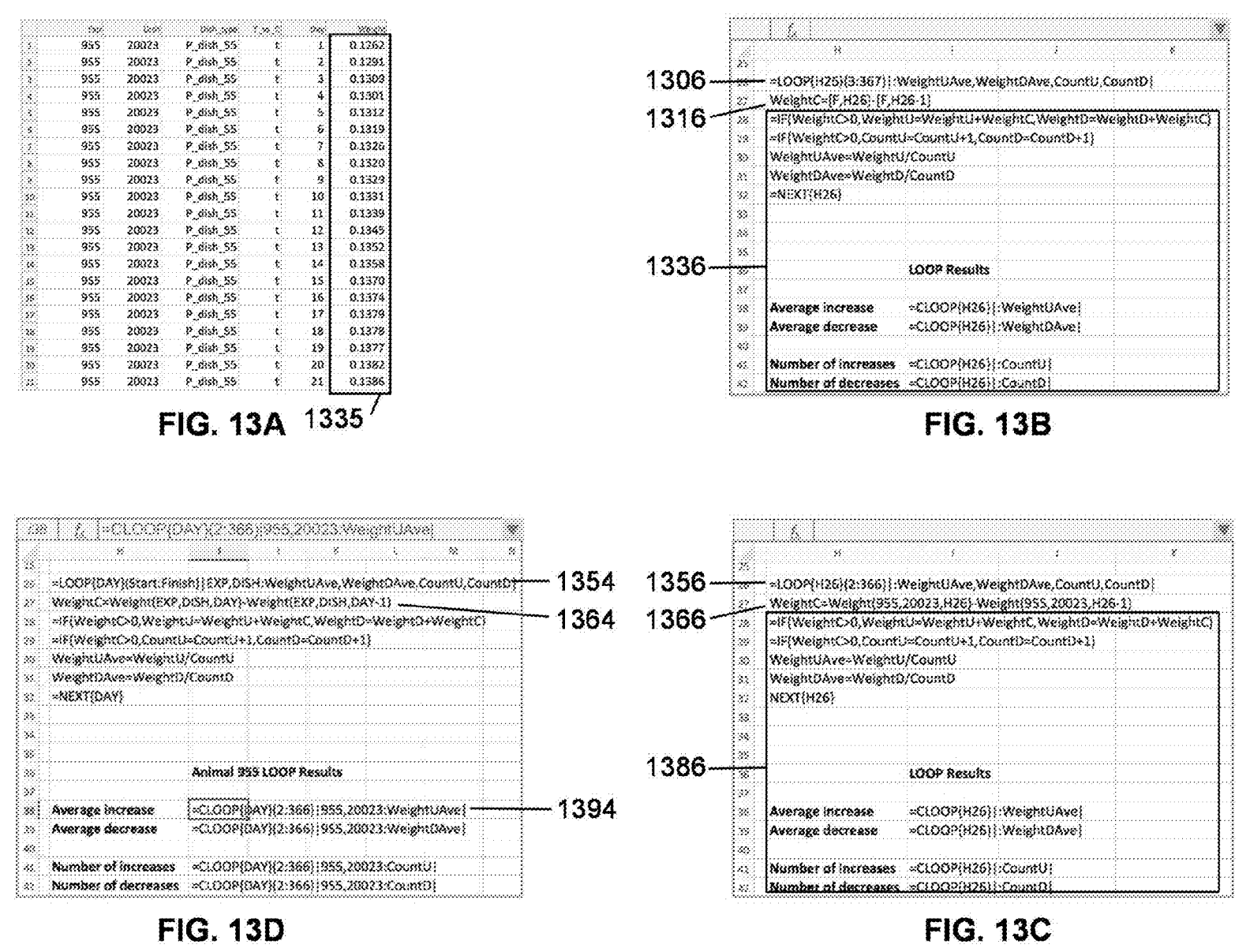

The disclosed technology for loops is an even more powerful capability for working with and creating non-spreadsheet cell (NSC) data. FIG. 13A shows the same small slice of cancer scientists' data as FIG. 12A although it now stored in the cloud in a data file not within spreadsheet cells, as part of a database set with thousands of experiments, using many different types of tests and test results.

For a user who wants to do the same LOOP calculations of FIG. 12C using cloud NSC data, the change is small even though the data does not reside in spreadsheet cells. The weight data 1335 shown in FIG. 13A contains the exact same values as the cell data in FIG. 12A with a slightly different database row numbering. FIG. 12C is repeated as FIG. 13B for easy comparison to the comparable spreadsheet calculation in FIG. 13C with formulaic NSC data utilizing the FIG. 13A cloud data. A comparison of the cloud data and spreadsheet data LOOPs shows all but two cells are identical, as shown by 1336 and 1386 being identical. The change to the first line is very small, with the spreadsheet cell data LOOP first line 1206 iterating '(3:367)' while the cloud data LOOP first line iterates '(2:366)'. The formula changes in the second lines are the largest change, going from WeightC=[F,H26]–[F,H26−1] 1316 to WeightC= Weight(955,20023,H26)–Weight(955,20023,H26−1) 1366—replacing the formulaic cell designators of the spreadsheet data version with formulaic data variables for the cloud data. Overall there very little change is required to shift the LOOP from spreadsheet cell data to using NSC data.

Given the ease of creating NSC data LOOPs and the availability of large amounts of data in the cloud, users need a more general ability to run the analysis, in which the LOOP is entirely general. In this example the specifying of which experiment and which dish is done outside the LOOP. FIG. 13D examples one way of doing that. To keep it as easy for users as possible the LOOP setup and call functions in this implementation are as similar as possible to the RUN ones. The big change to that setup is the addition of the LOOP iteration parentheses ( ) between the brackets { } holding the LOOP name or cell and the bars holding any input or output data. The parentheses ( ) contain the LOOP start and end point when needed (some LOOP types do not need them).

In FIG. 13D the call statements, such as the one in cell I38 1394, send the LOOP its start and endpoint '(3:366). I38 1394 also send the Exp, '955', and the Dish, '20023' for the formulaic data used in the LOOP. The LOOP generalizes that data in H26 1354 receiving the Exp, '955', as the named variable 'IEXP' and the Dish, '20023', as 'IDISH'. Therefore, those values are generalized and a user can pass any experiment number and any dish number they desire to analyze. The calculation in the second line, H27 1364 uses those generalized values to retrieve the desired cloud data and the remainder of the LOOP is unchanged from the version in FIG. 13C.

Other approaches can be used to get the correct data into the LOOP. In these examples we have opted to keep the RUN and LOOP functions as similar as possible while making them work well for cell and NSC data.

Figures 14A, 14B:
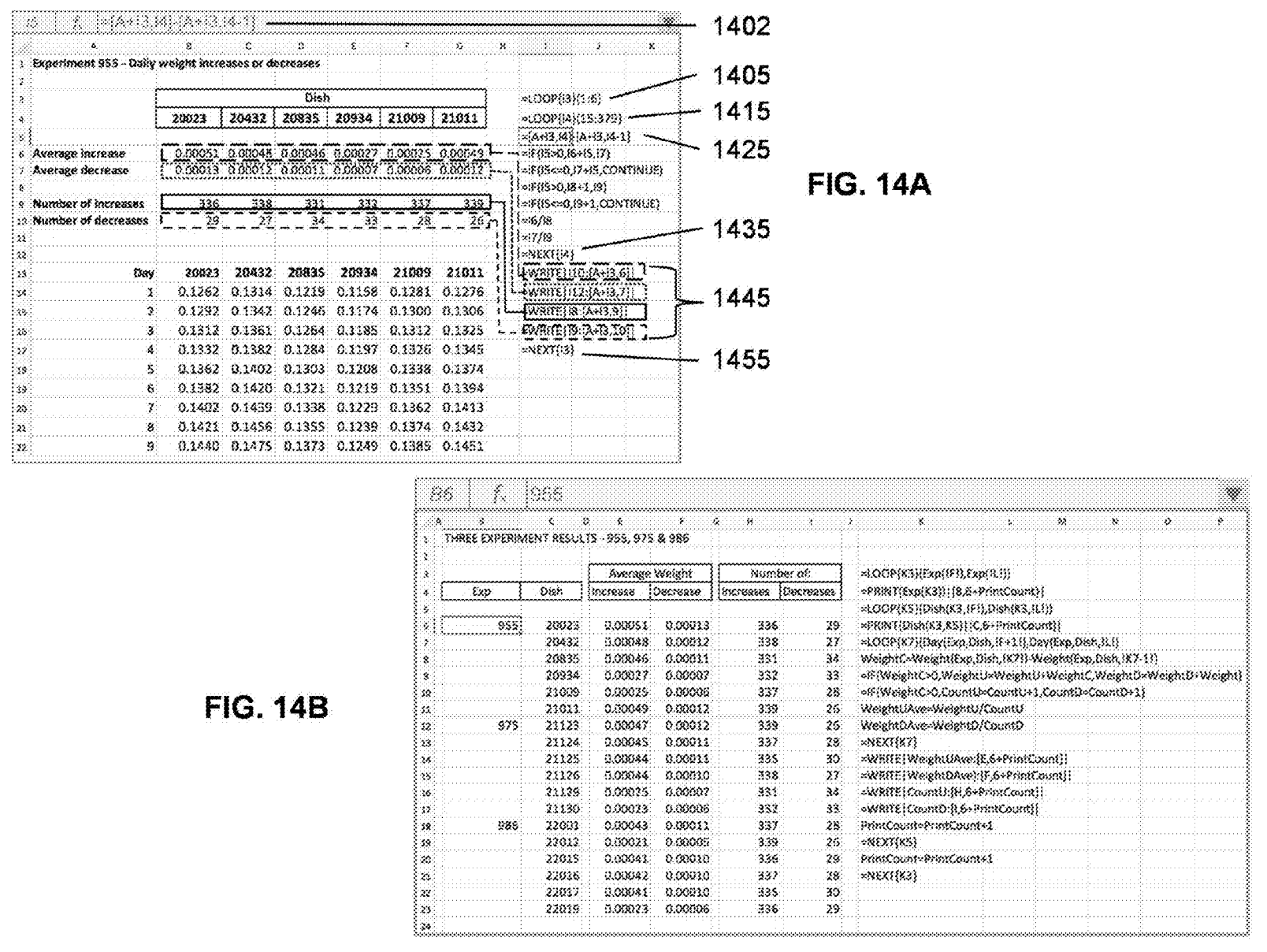

Thus far, we have discussed single loops. Spreadsheet users will also encounter many situations in which they would like to nest multiple loops. FIG. 14A examples nesting two loops using cell data and our spreadsheet technology WRITE function for outputting results. The two loops are initiated in cells I3 1405 and I4 1415 with the corresponding NEXTs in cells I12 1435 and I17 1455. The first loop, cell I3 1405, is looping once for each of the experiment dishes so it goes from 1 to 6 in the LOOP using '(1:6)' 1405. The second loop, cell I4 1415, is looping for each of the days on which there is comparative data, which in this example means starting in rows 15 and going to 379 so the LOOP is using '(15:379)' in 1415.

To get the correct cell data the user employees a formulaic cell designator with LOOP values used on both sides of cell designator in cell I5 1425. The first cell in the formula [A+I3,I4] shows how the designator uses a formula on the alpha part of the variable. In this example, for the first iteration of LOOP{I3}, I3=1 so the A+1=B, and for the second iteration of LOOP {I3}, I=2 so A+2=C, therefore moving the columns from which the data is retrieved. The second part of the designator is moving as a function the second LOOP {I4} and therefore for the first formulaic Cell designator in cell I5 1425 generates a value of 15 and for the second one 15−1=14. So the first iteration of the LOOP gets data from cell B15 and B14 to complete line I5 1415. This capability allows the LOOP to step through all the data in columns B through G. Exampling again how formulaic Cell Designators are a very powerful and simple way to formulaically get the right cell data.

FIG. 14A examples a new function for outputting the desired data to a cell location, our spreadsheet WRITE function. Cells I13 to I17 1445 employ the WRITE function to write the desired results in rows 6, 7, 9 and 10 as shown by the four sets of connected boxes shown in FIG. 14A. The WRITE function, in this implementation, has been configured to closely mirror our other input and output functions. Therefore, both the input and the output are within || with the input before the colon and the output after it. To help the user as they start to type in the =WRITE a pop-up will show the user what they need to fill in to complete it. This function makes it easy for the user to put answers generated by a LOOP wherever they would like.

In our technology, users can employ additional loops and different types of loops with relative ease. FIG. 14B examples a triple nested loop using a three-experiment set of data. However, with our technology LOOPs could call other LOOPs and very large amounts of analytics, way beyond the previous bounds of spreadsheets can be easily done by users.

LOOPs in our technology can also be used to create NSC data. Users doing analytics may want to create data sets larger or more complicated than would easily reside in a spreadsheet. Those data sets could then be used in other analytics or shared with other users for use in their analytics. Subsets of those large data sets could be written, via our WRITE function, to spreadsheet workbooks, tables, charts, dashboards, or other user outputs. More than one of those data sets may be the used in additional analytics allowing users to do very complicated large analytics from spreadsheet cells.

FIG. 15A examples cancer scientists creating a large NSC data set using the disclosed spreadsheet technology. The user is creating a three-dimensional data array for the change in weight each Day (3rd dimension), for each Dish (2nd dimension) and in each Experiment (1st dimension). Since in this example there are hundreds of experiments that may be of interest to numerous researchers, the data set can be very large. In preparation for the spreadsheet in FIG. 15A, the user has created a new NSC data variable through a library creation process for the data set 'DailyWChg(Exp, Dish,Day) in which they have defined what keys define the data set, in this case Exp, Dish, and Day. In the spreadsheet in FIG. 15A they calculate and STORE the NSC data. The three-dimensional data array is created by three nested LOOPs with the calculation of DailyWChg done in cell B6 1513. They then store the data to the cloud server using the disclosed STORE command in cell B7 1514. The STORE command in this implementation parallels our other data moving commands with a | then the input which in this case is the variable 'DailyWChg(B3,B4,B5)' then a colon : followed by the output, which in this example is the routing to the cloud data location 'Server55/Drive:D/Table_88'. While there are many other ways to set up the storage of spreadsheet generated data, the power of this using our formulaic data technology is that the data can be calculated and stored in the cloud, having never been stored in an individual's spreadsheet and therefore not limited by the size and complexity constraints of today's spreadsheets.

FIG. 15B shows a share option that the user can use if the data set is already stored. That SHARE command, as exampled in 1566, would also trigger a form of help shown here as the pop-up 1576. That pop-up gives the syntax for the variable to be shared and may show you the possible user groups it could be shared with. FIG. 15B also examples a combined store and share function 'STORESHARE'. As the user types 1586 the user gets a pop-up 1596 giving them instructions on what they need to specify and a couple of potential options they could select for storage locations and users or groups for the sharing. There of course are other ways for the users to store and share these NCS data sets, such as well as a user clicking a menu option to create a new NSC data field and getting a menu of options as to where and how they could store or share the data.

The sharing of this newly created NSC data can eliminate repetition of work across users as well as making it easier for individual users to tap large data sets in different worksheet activities without rework. It would also allow users to routinely update the data for sharing with others.

Figure 16A:
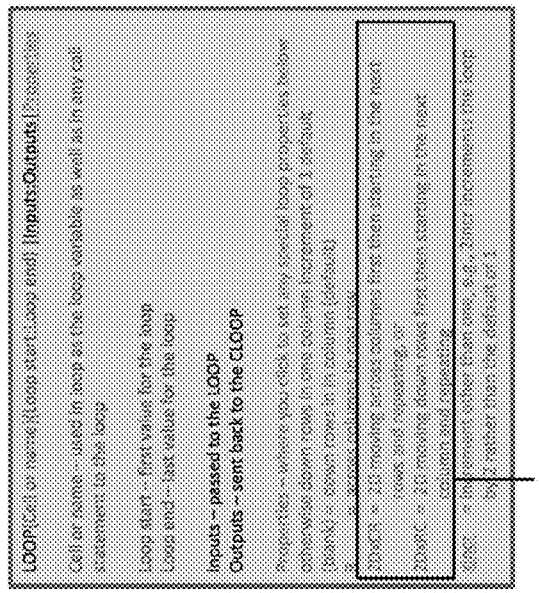
Figure 16B:
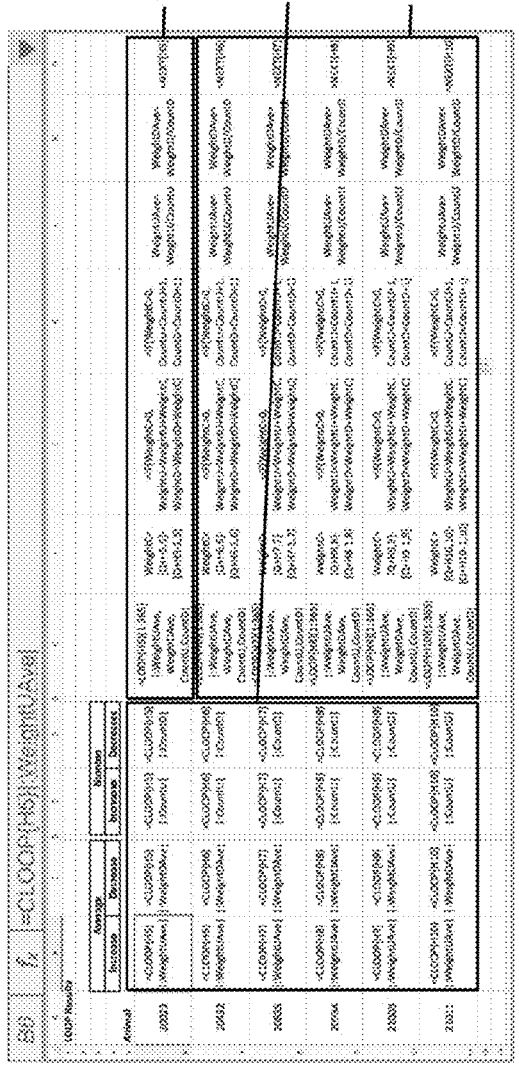
Figure 16C:
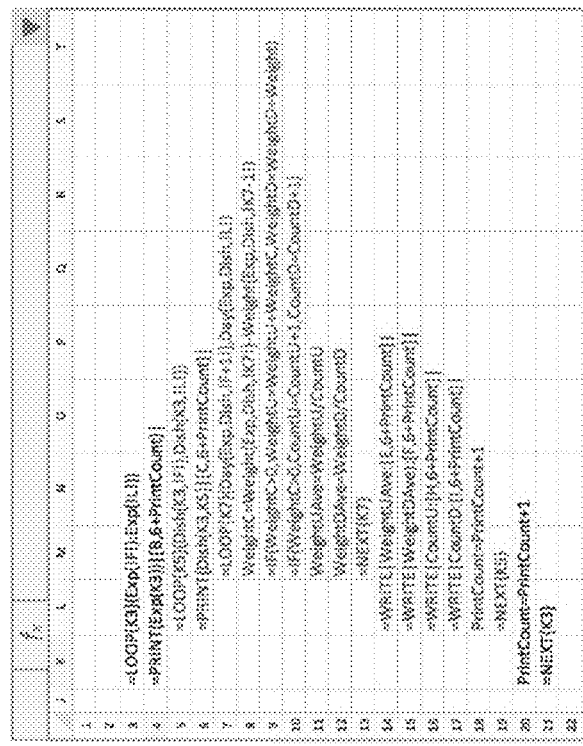

The example layout of the LOOPs and multiple cell RUN functions thus far has been progressive down a single column. Additionally, there are settings in which other options would be more user-friendly. The disclosed technology has the flexibility to accommodate other options. FIG. 16A shows an example in which the user constructs the LOOP across the spreadsheet rather than the typical down-a-column default. The LOOP runs from H6 to N6 1613. It has then been replicated five times 1633 to support the output mode the user constructed in 1622. FIG. 16B examples a convention many users may find helpful for nested LOOPs, specifically the indentation of each of the LOOPs. In this embodiment, this 2D approach has a couple of variants 1686 as described and specifiable using the pop-up shown in FIG. 16C. That pop-up also includes specialized increments, for situations in which the user wants to increment the LOOP iterations by a value different than the default of one.

Debugging Aid Use Case

With the LOOPs, multi-cell calculations and the ability to effectively program the use of large quantities of NSC data in spreadsheet cells, users will want more programming-like debugging capabilities. The ability to step through code and see the calculations in action is very common in the programming world and is an important part of the typical Integrated Development Environments (IDEs) used by programmers, but has not been a part of spreadsheets that do all-at-once recalculations. The disclosed technology includes a step-through-the-calculations ability to see the values and formulas as calculation progresses, for example for iterating through LOOPs.

FIG. 17A shows the first of a set of four examples stepping through calculations for three nested LOOPs. FIG. 17A shows the start of the first iteration with red calculation values having progressed to row 7 1734. FIG. 17B show the stepping of values having progressed to the end of the first iteration of the innermost LOOP. FIG. 17C shows the user having completed the first iteration of the second most inner LOOP and has shown the user the calculation values and has also displayed the results written out to the first line of the results table 1762. FIG. 17D shows the results of having completed the step-through of the outer most LOOP twice, with substantially more lines of the results table written out.

Giving the user an easy way to check the calculations by easily stepping through the calculations and easily see the formulas and the values will be an important aid for debugging any formula, function or data problems.

FIG. 18 is a block diagram of an example computer system, according to one implementation. Computer system 1810 typically includes at least one processor 1814 which communicates with a number of peripheral devices via bus subsystem 1812. These peripheral devices may include a storage subsystem 1824 including, for example, memory devices and a file storage subsystem, user interface input devices 1822, user interface output devices 1820, and a network interface subsystem 1816. The input and output devices allow user interaction with computer system 1810. Network interface subsystem 1816 provides an interface to outside networks, including an interface to communication network 1850, and is coupled via communication network 1850 to corresponding interface devices in other computer systems.

User interface input devices 1822 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1810 or onto communication network 1850.

User interface output devices 1876 may include a display subsystem, a printer, a fax machine, or non-visual displays such as audio output devices. The display subsystem may include a touch screen, a flat-panel device such as a liquid crystal display (LCD), a projection device, cathode ray tube (CRT), or some other mechanism for creating a visible image. The display subsystem may also provide a non-visual display such as via audio output devices. In general, use of the term "output device" is intended to include all possible types of devices and ways to output information from computer system 1810 to the user or to another machine or computer system.

Storage subsystem 1824 stores programming and data constructs that provide the functionality of some or all of the modules and methods described herein. These software modules are generally executed by processor 1814 alone or in combination with other processors.

Memory 1826 used in the storage subsystem can include a number of memories including a main random access memory (RAM) 1830 for storage of instructions and data during program execution and a read only memory (ROM) 1832 in which fixed instructions are stored. A file storage subsystem 1836 can provide persistent storage for program and data files, and may include a hard disk drive, a CD-ROM drive, an optical drive, or removable media cartridges. The modules implementing the functionality of certain implementations may be stored by file storage subsystem 1828 in the storage subsystem 1824, or in other machines accessible by the processor.

Bus subsystem 1850 provides a mechanism for letting the various components and subsystems of computer system 1810 communicate with each other as intended. Although bus subsystem 1850 is shown schematically as a single bus, alternative implementations of the bus subsystem may use multiple busses.

Computer system 1810 can be of varying types including a workstation, server, computing cluster, blade server, server farm, or any other data processing system or computing device. Due to the ever-changing nature of computers and networks, the description of computer system 1810 depicted in FIG. 18 is intended only as one example. Many other configurations of computer system 1810 are possible having more or fewer components than the computer system depicted in FIG. 18.

Figure 19:
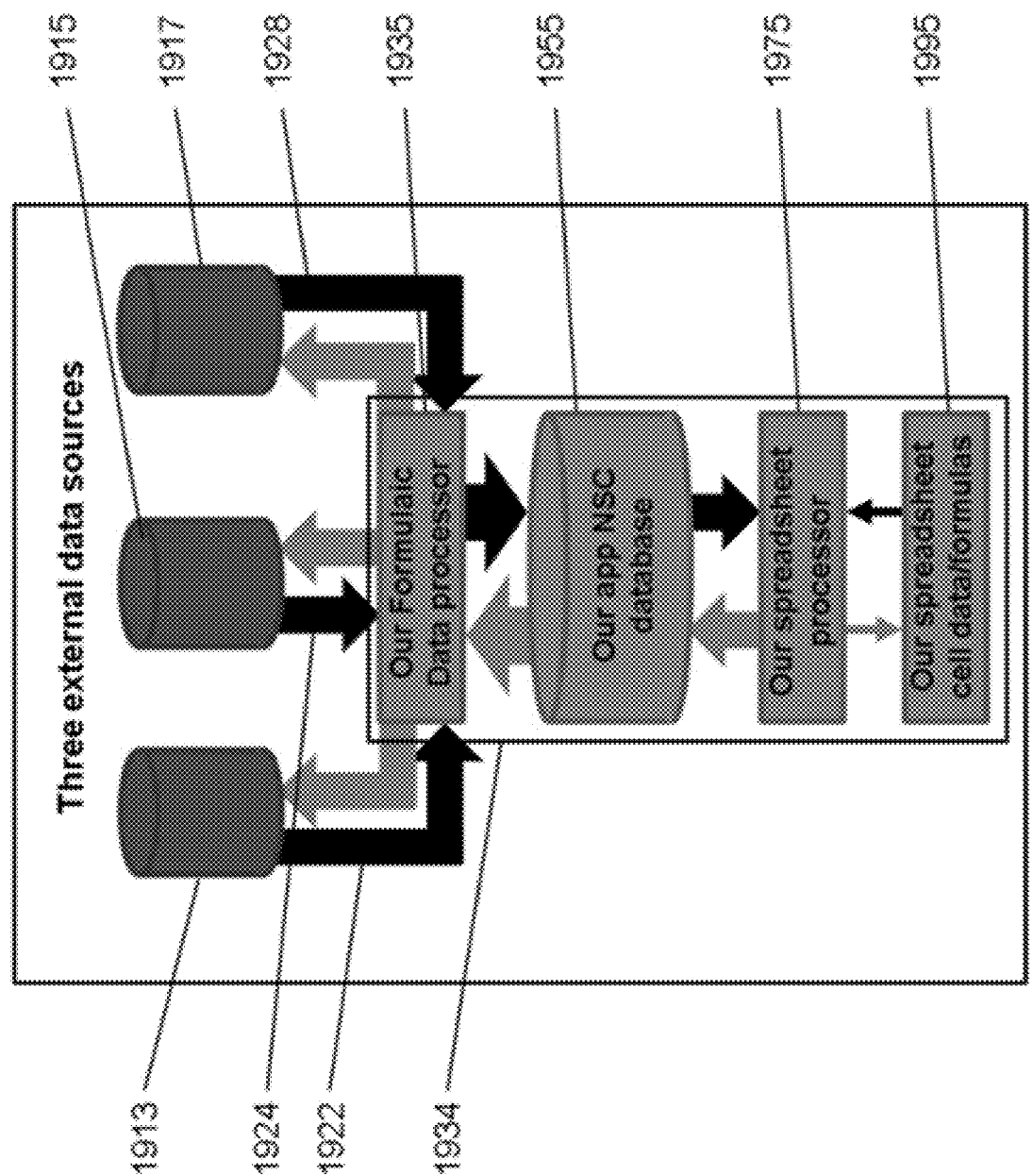
FIG. 19 examples the data flows to and from the Non-spreadsheet cell (NSC) data and the disclosed technology.

FIG. 19 shows one example set of data flows among our technology and three example external data sources, 1913, 1915, and 1917. In this example, these are cloud accessed databases doing batch updates to our system 1934. Those updates could range from one-time data feeds to real-time updates. That data then goes to our system via the black connections 1922, 1924, and 1928. It is processed in Our Formulaic Data processor 1935 where the external data is processed into our Formulaic Data variables for use in our spreadsheet cells, whether they are within a spreadsheet or used within another document. In this embodiment once the data is converted into our Formulaic Data it is then store in 'our app Non-spreadsheet cell (NSC) database' 1955 for use by our spreadsheet cells. That data is then available whenever a spreadsheet wants to use it, and in real-time applications is flowing immediately there.

Our spreadsheet processor 1975 then gets the Formulaic Data when desired from our app NSC database 1955 and combines it with any data and the formulas and functions from our spreadsheet cell data/formulas 1995. Our spreadsheet processor 1975 then does all the user desired calculations and returns the desired answers to the spreadsheet cells 1995 and if any of the data is set to be stored in our NSC database 1955 then it is sent there. From the NSC database 1955 it could then be SHARED with other users and it could also be shared with any of the desired external systems, in this example 1913, 1915, and 1917. The data could also be shared with systems from which no data was sourced provided the user has the authorization to send data to such a system. In such a situation, our Formulaic Data processor 1935 will convert our Formulaic Data to the format used by the external system and then do all the typical data transfer requirements to ensure complete and timely transmissions of the desired data. Our system will also then move, as needed, large quantities of Non-spreadsheet cell (NSC) data to our spreadsheet processor where it can be used for calculations in the temporary processor storage and then erased without having to be stored within the spreadsheet. Any of the desired data can be stored in the spreadsheet but in many usages most of it will be used in calculations and then replaced by the next set of data or erased. This allows a user of our technology to not be constrained by current spreadsheet limitations in the size and complexity of the data that they process in their spreadsheet cells.

Some Particular Implementations

Some particular implementations and features are described in the following discussion. The technology disclosed can be practiced as a variety of methods, devices or systems, or a computer readable media impressed with program instructions that, when executed on hardware, cause the hardware either to carry out a disclosed method or combine with the hardware to form a disclosed device or system.

One method implementation of the technology disclosed is a method of accessing external data in spreadsheet cells. The spreadsheet cells can be in a spreadsheet or incorporated into a presentation or other document, as described in the related applications. The method includes parsing a Formulaic Data description term from a first spreadsheet cell and identifying from the parsing a query to an external data source for a set of data containing one or more values fulfilling the query. In this context, the formulaic data term refers to a set of data terms that have order and interaction relationships somewhat like a mathematical formula. The formula part of the Formulaic Data description defines the query while the data part defines the external data for which that query will be executed. That query can be for external data using prespecified primary keys (keyed data), using no prespecified data keys (non-keyed data) or a combination of both. It can return a single value, it can return multiple values used in multiple spreadsheet cells, or it can return multiple values used in some type of spreadsheet function or calculation in one or more spreadsheet cells. That is, the method continues with obtaining from the external data source the data set fulfilling the query and buffering at least one value for use by spreadsheet cells. The method also includes, responsive to a spreadsheet copy/paste command, propagating the formulaic data description term from the first spreadsheet cell to a second spreadsheet cell range, adjusting the formulaic data description term during the propagating consistent with a column-wise and/or row-wise pattern of the propagating, and during the paste command evaluating each formulaic data variable in the second spreadsheet cell range using the external data responsive to the formulaic data query contained in the second spreadsheet cell range.

This method and other implementations of the technology disclosed can include one or more of the following features and/or features described above in connection with additional methods disclosed, without explicit enumeration, as would be indicated in European claiming practice by multiple dependent claims that depend from other multiple dependent claims. In the interest of conciseness, the combinations of features disclosed in this application are not individually enumerated and are not repeated with each base set of features.

Several special tokens can be used with a Formulaic Data description term. These tokens are obtained by parsing the Formulaic Data description term. A UNIQUE ELEMENTS command token of the formulaic data description term can be used to obtain an ordered set of the responsive data that includes available unique elements of the queried data. Using this token, the propagating of the formulaic data description term can include automatically iterating over the ordered set of the available unique elements. Examples of this command token can be specific letters or numbers within two exclamation points "! !", such as "!F!", "!L!", "!2!" or "!15!" which then determine the order of the iteration and/or the data to be selected from the external data set.

Another token, the INDIRECT INDEX REFERENCE token of the Formulaic Data description term, can control iteration over the available unique elements of the responsive data by using an indirectly referenced index value to access data from the available unique elements. The INDIRECT INDEX REFERENCE token can reference a key value or an ordinal position value used to access data from the available unique elements, such as using the letter "F" or "1" for the FIRST unique value, the letter "L" for the last unique value or a number "2" to select the second unique value.

The command elements and INDIRECT INDEX REFERENCES tokens can be used for both keyed and non-keyed Formulaic Data. In keyed data they can be used to select the keyed data designators or to select between the multiple data value designators. As exampled in FIG. 1 where keyed data designators of "Exp, "Dish, and "Date" are used and where the multiple data designator of" !! . . . !" is used.

An ADJUSTMENT CONSTRAINT command token of the Formulaic Data description term can control automatic adjustment of the Formulaic Data description term during the propagating, such as the $ which is typically used in spreadsheets to limit the replication.

A user friendly feature is that the system can generate a visual error message when spreadsheet copy/paste command of the second, target spreadsheet cell range selected for propagating extends onto more rows or columns of cells than there are available elements in the external data set for propagation to selected rows or columns. The message could be any number of different messages like "!NO NEXT!", "NO DATA" or "–". This applies both to unique elements and elements generally.

A BOUNDING VALUE token of the formulaic data description term can control a lower or upper bound of the query, or both, using a reference value extracted by the parsing. An INDIRECT INDEX REFERENCE token can be used to reference the bounding value, such as using the term F for the FIRST unique value and the term L for the LAST so a user can use the entire range of values without having to know the values or the number of values. This BOUNDING VALUE can also be used to set the order of the iteration such as from smallest to largest or largest to smallest or from A to Z or Z to A.

A non-unique ELEMENTS command token of the formulaic data description term can be used to obtain an ordered set of the entire external data, not just the unique values. Using the non-unique elements (vs. UNIQUE ELEMENTS) command the user will use the full set of values with as many duplicate values as exist for each unique value. Examples of this command token can be specific letters or numbers within two exclamation points "! !", such as "!FA!", "!LA!", "!2A!" or "!2A2!" which then determine the order of the data to be selected from the external data set.

Some implementations include making available in a dictionary alias names for indirect index references and bounding values that can be used as tokens in the formulaic data description term.

For one implementation of the disclosed method, a SPREADSHEET FUNCTION can be applied to the formulaic data description term to obtain the set of the responsive external data in the manner specified. Depending up the SPREADSHEET FUNCTION different actions are done on the set of responsive data defined by the formulaic data term. For example, if a SUM SPREADSHEET FUNCTION is used then the set of responsive data is aggregated to produce the summed value. If a COUNT or AVERAGE SPREADSHEET FUNCTION is employed, the values in the set of responsive data will be counted or averaged. Additionally, more complicated SPREADSHEET FUNCTIONS can be applied to formulaic data, including SUMIFS, advanced math, statistical, financial, engineering, and other functions.

Another method that implements the technology disclosed repeatedly performs a complex calculation in a spreadsheet, providing an alternative to macros and modules written in a programming language. This method includes parsing a column of cells from top cell that initiates running of a calculation, through intermediate cells that express parts of a calculation in at least three successive rows of the column, to an end cell that concludes the calculation in the column of the cells. The top cell includes a unit name to specifically identify each particular complex calculation, and at least one parameter accessible in the intermediate cells by parameter name. It also can include a unique token such as RUN used to identify it as a complex calculation. Upon invocation of the column of cells from a calling cell with at least one parameter, stepping through the column of cells, calculating a value according to spreadsheet formulas in the intermediate cells, and returning a result upon reaching the end cell as exampled in FIG. 10A and FIG. 10B.

As explained above, the preceding and following features and/or features described in connection with this and other methods are intended to be combined in many ways, without explicit enumeration, as would be indicated in European claiming practice by multiple dependent claims that depend from other multiple dependent claims. In the interest of conciseness, the combinations of features disclosed in this application are not individually enumerated and are not repeated with each base set of features.

Some implementations further include named variables. In one implementation, this includes parsing a cell in the column of cells and identifying a name on a left side of an assignment operator such as an '=' sign. The method instantiates a named variable symbolically referenced by the name and assigns a value to the named variable based on at least one term on a right side of the assignment operator. The method makes the assigned value of the named variable available for reference by cells of the spreadsheet. For instance, these named variables can be used in formulas in spreadsheets.

Instantiating a named variable within a first intermediate cell among the intermediate cells, assigning an intermediate result to the named variable, and using the intermediate result in a second intermediate cell among the intermediate cells by using the name of the named variable in the second intermediate cell. Capabilities of a named variable include updating the named variable by assigning a further result in a third intermediate cell and using the named variable with the updated assigned result in a fourth intermediate cell.

Both outside the column of cells and inside the column of cells, named variables can be referenced for the values that they hold, using variable names. Named variables can be explicitly named by placing a name to the left of an equal "=" sign, as shown in 1153 of FIG. 11A and 1364 of FIG. 13D. They can also be named in other ways such as by placing them in the output of a RUN or LOOP statement, as exampled in 1354 in FIG. 13D.

Typically, the spreadsheet formulas in the intermediate cells collectively perform a multi-step calculation and the column of cells returns at least one result of the calculation, sometimes making available intermediate calculation results. In repetitive use of the column of cells running the calculation the value or values recorded by an initiating statement, such as a CRUN or a CLOOP, are not altered by other usage of the column of cells as shown in FIG. 11B where each of the Plays ("Play 1" through "Play 4") runs the calculations in the column of cells and records its generated values, which are not altered by the usage by the next Play.

Some implementations further include assigning different types of unit names to the collection of cells that implement a calculation. A unit name can be based on a cell location of the top cell. Alternatively, the unit name can be a unique default variable name. FIG. 11A, examples using a unique default variable name ("ScriptT") for a unit name. A default name can be a default unit name based on a cell location of the top cell. It can be a default variable name applied to a result of calculation in a cell within the column, the default name based on a cell location of an intermediate cell. Use of default names, differentiated from explicitly named variables, is illustrated in FIG. 10A, in the related context of loops and examples using a unit name based on a cell location, in this example "D3".

Another method that implements the technology disclosed performs a looping calculation in a spreadsheet. It includes parsing a column of cells from top cell that initiates running of a looping calculation, through intermediate cells that express parts of the looping calculation in at least three successive rows of the column, to a next cell that marks an end of the looping. The top cell includes a unit name to specifically identify the particular loop and one or more parameters or values that set a number of potential loop iterations or a condition that must be satisfied to conclude the loop. For example, that could be the beginning and ending iteration values as exampled in 1208 in FIG. 12B. It could be named variables as shown in FIG. 13D. Another method of doing it would be to pass a value that when reached by the loop ends the iteration. The loop can include a unique token such as LOOP that identifies it as a loop. Upon invocation of the column of cells from a calling cell or the execution of the top cell, stepping through the column of cells, calculating a value according to spreadsheet formulas in the intermediate cells, and either looping or exiting the looping after reaching a command or the cell and iteration value that marks the end of looping. Some implementations of the disclosed technology further include repetitive use of a loop where the value or values recorded outside of the loop and not reset by the loop are not affected when the loop is used with different input values.

As explained above, the preceding and following features and/or features described in connection with this and other methods are intended to be combined in many ways, without explicit enumeration, as would be indicated in European claiming practice by multiple dependent claims that depend from other multiple dependent claims. In the interest of conciseness, the combinations of features disclosed in this application are not individually enumerated and are not repeated with each base set of features.

Some implementations include multiple nested loops within the column of cells. Some include assigning default names within the column based on cell locations of the cells in the column. Outside the column of cells (the column meaning from the top cell through at least the next cell or a loop return) the method can include referencing a location within the column of cells to access a last value calculated by a formula in the referenced location prior to exiting the looping. Similarly, inside the column of cells, this can include referencing a location within the column of cells to access a last value calculated by a formula in the referenced location during the looping.

Some implementations include instantiating a named variable within a first intermediate cell among the intermediate cells, assigning an intermediate result to the named variable, and using the intermediate result in a second intermediate cell among the intermediate cells by using the name of the named variable in the second intermediate cell. Recast in different words, some implementations include instantiating pseudo-named variables that have names matching locations of the intermediate cells, zeroing the instantiated pseudo-named variables when the column of cells is invoked, and allowing operations to modify values of the pseudo-named variables. Both outside the column of cells and inside the column of cells, named variables can be referenced for the values that they hold, using variable names. Named variables can be explicitly named by placing a name to the left of an equal "=" sign, as shown in 1153 of FIG. 11A and 1364 of FIG. 13D.

Some implementations include parsing multiple adjoining columns of cells from top to bottom and, within a row, from left to right. In repetitive use of loops, the value or values recorded outside of the loop and not reset by the loop are not affected when the loop is used by a different initiating statement, such as 1394 in FIG. 13D, that is sending different input values to the loop.

Some implementations include our formulaic cell designator that allows a user to separately specify the row and column designator values of a spreadsheet cell and then increment or change those values as done in 1218 of FIG. 12B. This can be used in loops to retrieve different cell data, as in FIG. 12B, WRITE different data, as in 1445 in FIG. 14A, or for other situations like in a Formula or function where a user would like to more finely control a cell value or range of values used (e.g., like setting the start and finish point for a SUM, COUNT or AVE function).

Some implementations include an increment cell which can add or subtract to its self. This capability is very important for keeping totals within a loop but is not possible with current spreadsheets where a cell cannot equal itself and where formulas attempting that will generate a circular reference error. We therefore create a capability where a cell value can be on the left side of the '=' sign and be the cell within which it is created so as to create the increment cell that can change its own value starting with its previous value. It can also be done so that when the cell reference is used in a formula or function within that cell it will calculate a new value of for the cell using the previous value as exampled in cell H28 1216 in FIG. 12B.

Some implementations include a named variable equivalent of an increment cell, called by us an increment variable, where that variable can be on both sides of a formula '=' sign and the value on the left side will be the new value using the previous value on the right side of the '=' sign. Such as exampled in 1257 of FIG. 12C where depending on an IF statement CountU=CountU+1 1267 or where CountD=CountD+1 1277 execute an increment to either CountU or CountD.

Some implementations include a WRITE function used to display specified content in a different cell or cells of the spreadsheet. This capability when combined with formulaic cell designators and loops can then display content in multiple cells from the WRITE statement within a single cell of a spreadsheet, as exampled in FIG. 14A 1445.

Some implementations of our multicell functions, exampled by our RUN and LOOP capabilities, further allow a step by step operation moving through the calculations a step at a time as shown for the iterations of a loop in FIG. 17A-D. This can be done as progressive steps through process or one where a user highlights an output, such as a value displayed by our WRITE function, and can see the calculation values that generated that output. In the progressive steps the user could go line by line, or in a loop iteration by iteration seeing the values for each of the named or formulaic data variables.

These method implementations of the technology disclosed also can be practiced as a device or system. A device can include program instructions in a memory coupled to one or more processors that cause the device to locally implement any of the methods disclosed. A system can include a local device running a browser or light weight interface, which uses network based web apps and connects to a server, instead of using traditional applications to implement the technology disclosed.

Yet another implementation may include a tangible, non-transitory computer readable storage media including computer program instructions loaded with instructions that, when combined with a computer hardware device and executed, cause a computer to implement any of the methods described earlier. In this application, tangible computer readable storage media do not include non-patentable transitory signals. While the technology disclosed could be implemented using transitory signals, reference to tangible computer readable storage media does not include the non-patentable transitory signals. If the law changes and transitory signals become patentable, separate claims may be made to transitory signals.

Yet another implementation may include a tangible, non-transitory computer readable media, including program instructions loaded onto the media that, when combined with computer hardware, implements any of the devices or systems described.

Other implementations may include a non-transitory computer readable storage medium storing instructions executable by a processor to perform a method as described above. Yet another implementation may include a system including memory and one or more processors operable to execute instructions, stored in the memory, to perform a method as described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

I claim as follows:

1. A method of accessing external data in spreadsheet cells, including:
    parsing a formulaic data description term from a first spreadsheet cell and identifying from the parsing a query, to an external data source, for first values responsive to the query;
    obtaining the first values from the external data source responsive to the query, buffering the first values in memory accessible to the spreadsheet, and using the first values to calculate a result placed in the first spreadsheet cell, without including in the first spreadsheet cell the first values;
    responsive to a spreadsheet copy/paste command, propagating the formulaic data description term from the first spreadsheet cell to a second spreadsheet cell range, and adjusting values to be retrieved responsive to the formulaic data description term during the propagating consistent with one or more of a column-wise and a row-wise pattern of the propagating; and
    responsive to the copy/paste command, obtaining second values for each cell in the second spreadsheet cell range responsive to respective adjusted formulaic data description terms in respective cells in the second spreadsheet cell range, and using the second values to calculate a respective result that is placed in each cell in the second spreadsheet cell range, without including in cells of the second spreadsheet cell range the second values.

2. The method of claim 1, further including parsing a UNIQUE ELEMENTS command token of the formulaic data description term and obtaining an ordered set of values that includes available unique elements responsive to the query.

3. The method of claim 2, wherein the propagating the formulaic data description term further includes automatically iterating over the ordered set of the available unique elements.

4. The method of claim 3, further including parsing an INDIRECT INDEX REFERENCE token of the formulaic data description term that controls iteration over the available unique elements and using an indirectly referenced index value to access data from the available unique elements.

5. The method of claim 4, wherein the INDIRECT INDEX REFERENCE token references a key value used to access data from the available unique elements.

6. The method of claim 4, wherein the INDIRECT INDEX REFERENCE token references an ordinal position value used to access data from the available unique elements.

7. The method of claim 1, further including parsing an ADJUSTMENT CONSTRAINT command token of the formulaic data description term that controls automatic adjustment of the formulaic data description term during the propagating.

8. The method of claim 1, further including, responsive to the copy/paste command, generating a visual error message when the second spreadsheet cell range selected for propagating extends to more rows or columns of cells than there are available values for propagation to selected rows or columns.

9. The method of claim 1, further including parsing a BOUNDING VALUE token of the formulaic data description term that controls a bound of the query and using a reference value extracted by the parsing to bound the query.

10. The method of claim 9, further including parsing an INDIRECT INDEX REFERENCE token of the formulaic data description term that references the BOUNDING VALUE token.

11. The method of claim 1, further including parsing an ELEMENTS command token of the formulaic data description term and obtaining an ordered set of values responsive to the query.

12. The method of claim 1, wherein calculating the result of the formulaic data description term includes applying one or more algebraic operations to multiple values obtained from the external data source.

13. The method of claim 12, wherein the formulaic data description term includes at least one predefined spreadsheet function that operates on multiple values obtained from the external data source, further including applying the one or more algebraic operations to a result calculated by operation of the predefined spreadsheet function.

14. The method of claim 1, wherein calculating the result of the formulaic data description term includes applying a predefined spreadsheet function to multiple values obtained from the external data source.

15. The method of claim 1, wherein calculating the formulaic data description term includes applying multiple predefined spreadsheet functions to sets of multiple values obtained from the external data source.

16. The method of claim 1, wherein the formulaic data description term includes a name for a first field and one or more indexes for the first field that are referenced by position or by field name, either directly or indirectly.

17. A tangible computer readable storage media loaded with instructions that, when combined with a hardware device, configures the hardware device to carry out the method of claim 1.

* * * * *